United States Patent
Chao et al.

(10) Patent No.: US 8,775,393 B2
(45) Date of Patent: *Jul. 8, 2014

(54) UPDATING A PERFECT HASH DATA STRUCTURE, SUCH AS A MULTI-DIMENSIONAL PERFECT HASH DATA STRUCTURE, USED FOR HIGH-SPEED STRING MATCHING

(75) Inventors: H. Jonathan Chao, Holmdel, NJ (US); Yang Xu, Brooklyn, NY (US)

(73) Assignee: Polytechniq Institute of New York University, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,974

(22) Filed: Mar. 1, 2012

(65) Prior Publication Data

US 2013/0086004 A1 Apr. 4, 2013

Related U.S. Application Data

(60) Provisional application No. 61/542,570, filed on Oct. 3, 2011.

(51) Int. Cl.
*G06F 17/30* (2006.01)
*G06F 12/00* (2006.01)
*G06F 7/00* (2006.01)
*H04L 29/06* (2006.01)

(52) U.S. Cl.
CPC ...... *H04L 63/1416* (2013.01); *G06F 17/30958* (2013.01); *G06F 17/30949* (2013.01); *G06F 17/30946* (2013.01); *G06F 17/30985* (2013.01); *H04L 63/0245* (2013.01)
USPC .......................................... 707/698; 711/216

(58) Field of Classification Search
CPC ............ H04L 63/1416; H04L 63/0245; G06F 17/30958; G06F 17/30949; G06F 17/30946; G06F 17/30985
USPC .................................................. 707/E17.039
See application file for complete search history.

(56) References Cited

U.S. PATENT DOCUMENTS 5,692,177 A * 11/1997 Miller .................................... 1/1
7,370,048 B2 * 5/2008 Loeb ..................................... 1/1

(Continued)

FOREIGN PATENT DOCUMENTS

EP 1872557 B1 * 6/2010

OTHER PUBLICATIONS

Carrasco, Rafael C., Jan Daciuk, and Mikel L. Forcada. "Incremental construction of minimal tree automata." Algorithmica 55, No. 1 (2009): 95-110.*

(Continued)

*Primary Examiner* — Sherief Badawi
*Assistant Examiner* — Jesse P Frumkin
(74) *Attorney, Agent, or Firm* — John C. Pokotylo; Straub & Polotylo

(57) ABSTRACT

A representation of a new rule, defined as a set of a new transition(s), is inserted into a perfect hash table which includes previously placed transitions to generate an updated perfect hash table. This may be done by, for each new transition: (a) hashing the new transition; and (b) if there is no conflict, inserting the hashed new transition into the table. If, however, the hashed new transition conflicts with any of the previously placed transitions, either (A) any transitions of the state associated with the conflicting transition are removed from the table, the hashed new transition is placed into the table, and the removed transitions are re-placed into the table, or (B) any previously placed transitions of the state associated with the new transition are removed, and the transitions of the state associated with the new transition are re-placed into the table.

19 Claims, 19 Drawing Sheets

(56) References Cited

U.S. PATENT DOCUMENTS

| | | | |
|---|---|---|---|
| 7,571,299 B2* | 8/2009 | Loeb | 711/216 |
| 7,769,788 B2* | 8/2010 | Duxbury | 707/803 |
| 7,876,748 B1* | 1/2011 | Conner et al. | 370/389 |
| 7,895,211 B2* | 2/2011 | Loeb | 707/747 |
| 8,271,500 B2* | 9/2012 | Chellapilla et al. | 707/747 |
| 8,272,056 B2* | 9/2012 | Sahni et al. | 726/23 |
| 2005/0055437 A1* | 3/2005 | Burckart et al. | 709/224 |
| 2007/0027867 A1 | 2/2007 | Ichino | |
| 2007/0088717 A1 | 4/2007 | Chen | |
| 2008/0052644 A1* | 2/2008 | Ashar et al. | 716/2 |
| 2009/0164485 A1* | 6/2009 | Burke et al. | 707/100 |
| 2012/0124060 A1 | 5/2012 | Muskal et al. | |
| 2012/0143877 A1* | 6/2012 | Kumar et al. | 707/747 |
| 2012/0206279 A1* | 8/2012 | Artan et al. | 341/51 |
| 2013/0086017 A1 | 4/2013 | Chao et al. | |

OTHER PUBLICATIONS

Daciuk, Jan, and Rafael C. Carrasco. "Perfect hashing with pseudo-minimal bottom-up deterministic tree automata." Intelligent Information Systems XVI, Proceedings of the International IIS 8: 16-18.*

Celis, Pedro "Robin hood hashing." Thesis, University of Waterloo, 1986. Data Structuring Group, Department of Computer Science, Waterloo, Ontario, N2L 3G1.*

Munro, J. Ian, and Pedro Celis. "Techniques for collision resolution in hash tables with open addressing." In Proceedings of 1986 ACM Fall joint computer conference, pp. 601-610. IEEE Computer Society Press, 1986.*

Kastil, Jan, Jan Korenek, and Ondrej Lengal. "Methodology for fast pattern matching by deterministic finite automaton with perfect hashing." In Digital System Design, Architectures, Methods and Tools, 2009. DSD'09. 12th Euromicro Conference on, pp. 823-829. IEEE, 2009.*

Shinohara, Toshio Nishimura Shuichi Fukamachi Takeshi. "Speed-up of aho-corasick pattern matching machines by rearranging states." (2001).*

Dietzfelbinger, Martin, Anna Karlin, Kurt Mehlhorn, Friedhelm Meyer Auf Der Heide, Hans Rohnert, and Robert E. Tarjan. "Dynamic perfect hashing: Upper and lower bounds." SIAM Journal on Computing 23, No. 4 (1994): 738-761.*

Thinh, Tran Ngoc, Surin Kittitornkun, and Shigenori Tomiyama. "Applying cuckoo hashing for FPGA-based pattern matching in NIDS/NIPS." In Field-Programmable Technology, 2007. ICFPT 2007. International Conference on, pp. 121-128. IEEE, 2007.*

Loeb, Mitchell, and Alan L. Tharp. "Gray code chaining: a high performance hashing algorithm for limited storage applications." In Information Technology, 2007. ITNG'07. Fourth International Conference on, pp. 1014-1014. IEEE, 2007.*

Deodhar, Sushamna, and Alan L. Tharp. "Shift Hashing for Memory-Constrained Applications." In Computer Software and Applications Conference, 2009. COMPSAC'09. 33rd Annual IEEE International, vol. 1, pp. 531-536. IEEE, 2009.*

Carrasco, Rafael C., and Jan Daciuk. "A perfect hashing incremental scheme for unranked trees using pseudo-minimal automata." RAIRO-Theoretical Informatics and Applications 43, No. 4 (2009): 779-790).*

Raja, N. Kannaiya, K. Arulanandam, and G. Ambika ME. "A Novel Efficient Pattern Matching Packet Inspection by using δnFA."*

* cited by examiner

| State 0 | State 1 | State 2 | State 3 | State 4 |
|---|---|---|---|---|
| (0,h)→1 | (1,e)→2 | (2,r)→8 | (3,h)→4 | (4,e)→5 |
| (0,m)→10 | (1,i)→6 | | | |
| (0,s)→3 | | | | |

| | | | | |
|---|---|---|---|---|
| State 6 | State 8 | State 10 | | |
| (6,s)→7 | (8,s)→9 | (10,e)→11 | | |
| (6,m)→12 | | | | |

| Seq | 1 | 2 | 3 | 4 | 5 | 6 | 7 | 8 | 9 | 10 |
|---|---|---|---|---|---|---|---|---|---|---|
| Node | 11 | 9 | 7 | 5 | 12 | 3 | h | 2 | r | 4 |
| Dependent edge set | | | | | | <3,h> | <0,h> | <2,r> | | <4,e> |

| Seq | 11 | 12 | 13 | 14 | 15 | 16 | 17 | 18 | 19 | |
|---|---|---|---|---|---|---|---|---|---|---|
| Node | 10 | e | 1 | i | 8 | 0 | s | 6 | m | |
| Dependent edge set | <10,e> | <1,e> | <1,i> | | <8,s> | <0,s> | <6,s> | <6,m> | | |
| | <0,m> | | | | | | | | | |

| Seq | 1 | 2 | 3 | 4 | 5 | 6 | 7 | 8 | 9 | 10 |
|---|---|---|---|---|---|---|---|---|---|---|
| Node | 11 | 9 | 7 | 12 | 3 | h | r | 2 | i | 1 |
| Dependent edge set | $<11,\gamma_5>$ | $<9,\gamma_1>$ | $<7,\gamma_3>$ | $<12,\gamma_4>$ | $<3,h>$ | $<0,h>$ | $<2,r>$ | $<2,\gamma_2>$ | $<1,i>$ | $<1,e>$ |

| Seq | 11 | 12 | 13 | 14 | 15 | 16 | 17 | 18 | 19 | |
|---|---|---|---|---|---|---|---|---|---|---|
| Node | 4 | e | 10 | 8 | 5 | 0 | s | 6 | m | |
| Dependent edge set | $<4,e>$ | $<10,e>$ | | $<8,s>$ | $<5,\gamma_2>$ $<5,\gamma_6>$ | $<0,s>$ $<0,m>$ | $<6,s>$ | $<6,m>$ | | |

FIGURE 15

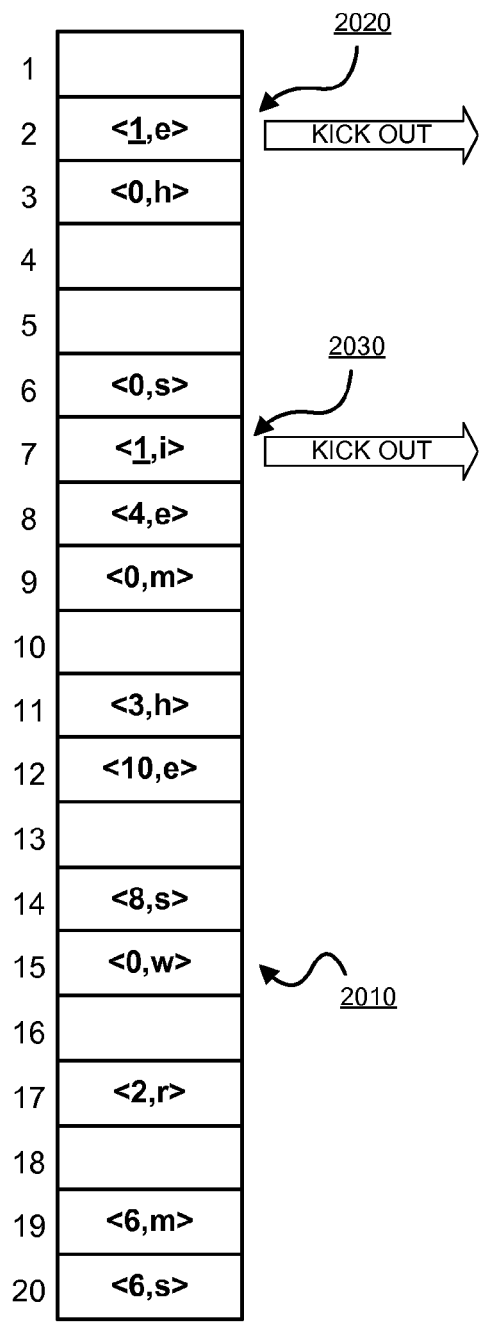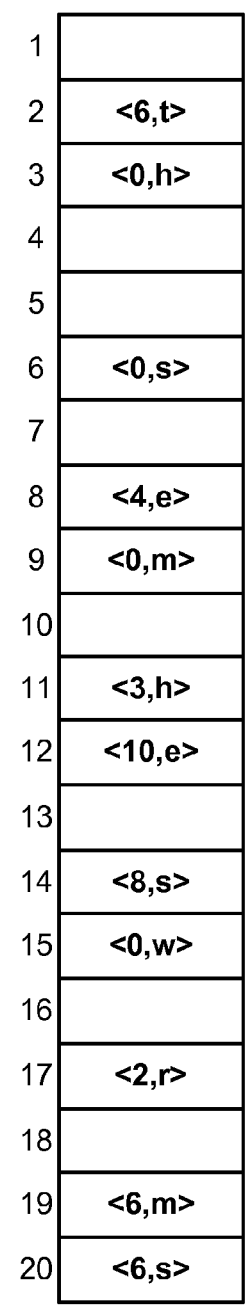
FIGURE 20a                    FIGURE 20b

US 8,775,393 B2

UPDATING A PERFECT HASH DATA STRUCTURE, SUCH AS A MULTI-DIMENSIONAL PERFECT HASH DATA STRUCTURE, USED FOR HIGH-SPEED STRING MATCHING

§0. PRIORITY CLAIM

This application claims the benefit of U.S. Provisional Patent Application Ser. No. 61/542,570 (incorporated herein by reference and referred to as "the '570 provisional"), titled "A MULTI-DIMENSIONAL PROGRESSIVE PERFECT HASHING FOR HIGH SPEED STRING MATCHING," filed on Oct. 3, 2011, and listing Hung-Hsiang Jonathan Chao and Yang Xu as inventors. The present invention is not limited to requirements of the particular embodiments described in the '570 provisional.

§1. BACKGROUND OF THE INVENTION

§1.1 Field of the Invention

The present invention concerns matching an arbitrary-length bit string with one of a number of known arbitrary length bit strings. Embodiments consistent with the present invention may be used for network intrusion detection and prevention. In particular, some embodiments consistent with the present invention concern generating a data structure which provides perfect hashing functionality. By using such a data structure, string matching can be checked at high speed. At least some embodiments consistent with the present invention concern updating hash tables to include new rules.

§1.2 Background Information

Network intrusion detection systems ("NIDS") have been widely deployed in today's Internet to safeguard the security of network operations. Among the many network-based intrusion detection techniques (See, e.g., the references: L. Feinstein, D. Schnackenberg, R. Balupari, and D. Kindred, "Statistical Approaches to Ddos Attack Detection and Response," *DISCEX* (2003); L. Spitzner, *Honeypots: Tracking Attackers*, Addison-Wesley (2002); M. Becchi and P. Crowley, "Efficient Regular Expression Evaluation: Theory to Practice," *Proceedings of the 2008 ACM/IEEE Symposium on Architectures for Networking and Communications Systems (ANCS)* (San Jose, Calif., November 2008); and F. Yu, "High Speed Deep Packet Inspection with Hardware Support," PhD dissertation of University of California at Berkeley (Berkeley, Calif., 2006), each incorporated herein by reference.), multi-string matching is commonly used because of its precision and accuracy in attack detection.

Many multi-string matching schemes have been proposed. (See, e.g., the references: S. Wu and U. Manber, "A Fast Algorithm for Multi-Pattern Searching," *Technical Report T-94-17*, Department of Computer Science, University of Arizona (1994); S. Dharmapurikar and J. W. Lockwood, "Fast and Scalable Pattern Matching for Network Intrusion Detection Systems," *IEEE Journal of Selected Areas in Communications*, Vol. 24, No. 10 (2006); H. Lu, K. Zheng, B. Liu, X. Zhang, and Y. Liu, "A Memory-Efficient Parallel String Matching Architecture for High-Speed Intrusion Detection," *IEEE Journal of Selected Areas in Communications*, Vol. 24, No. 10 (2006); N. Hua, H. Song, T. V. Lakshman, "Variable-Stride Multi-Pattern Matching For Scalable Deep Packet Inspection", *IEEE INFOCOM* (2009); J. van Lunteren, "High-Performance Pattern-Matching for Intrusion Detection," *IEEE INFOCOM* (2006); and N. Tuck, T. Sherwood, B. Calder, and G. Varghese, "Deterministic Memory-Efficient String Matching Algorithms for Intrusion Detection," *IEEE INFOCOM* (2004), each incorporated herein by reference.) Most of these proposed schemes are derived from the classic Aho-Corasick ("AC") automaton (See, e.g., the reference A. V. Aho and M. J. Corasick, "Efficient String Matching: An Aid To Bibliographic Search," *Communications of the ACM*, Vol. 18, No. 6, pp. 333-340 (1975), incorporated herein by reference.) This is because AC's worst case performance is deterministic, linear to the length of the input stream and independent of the rule (e.g., one of the bit strings against which an input is checked for match) set size. Therefore, an attacker cannot construct worst-case traffic that can slow down the NIDS and let malicious traffic escape the inspection. In fact, many popular NIDS and anti-virus systems, such as Snort (See, e.g., A free lightweight network intrusion detection system for UNIX and Windows, available online at http://www.snort.org, incorporated herein by reference.) and ClamAV (See, e.g., ClamAV, available online at http://www.clamay.net, incorporated herein by reference.) for example, have already implemented an AC automaton as their multi-string matching engines.

The AC automaton is introduced in §1.2.1 below. Then, multi-string matching schemes using the AC automaton (and their perceived limitations) are introduced in §1.2.2. Thereafter, other multi-string matching schemes are introduced in §1.2.3. Finally, desired characteristics of a multi-string matching scheme are discussed in §1.2.4.

§1.2.1 Aho-Corasick Automaton

The Aho-Corasick (AC) automaton is one of the most widely used algorithms in multi-string matching. As noted above, given its well-known deterministic matching throughput, it is not vulnerable to attack traffic. Provided with a set of string patterns (also referred to as "rules"), the construction of an AC automaton includes two steps. In the first step, a trie structure is created based on the set of string patterns (rules). Each state (represented as a node) on the trie corresponds to a valid prefix (matching a part) of the string patterns. The edges on the trie are called "goto transitions" of the AC automaton. In the second step, "failure transitions" are added from each state s to a state d if the prefix represented by state d is the longest suffix of the prefix represented by state s.

Consider, for example, a set of string patterns (that is, a rule set) {hers, he, his, him, me, she}. FIG. 1 illustrates an AC automaton for rule set {hers, he, his, him, me, she}, in which the solid arrows represent the goto transitions, and the dotted arrows represent the failure transitions. For simplicity, failure transitions to the root state are not shown.

Given an active state s and an input character c, the AC automaton will first check to determine if there is a goto transition from state s labeled with input character c. If such a goto transition exists, the state pointed by the goto transition will be the next active state (e.g., the active state in the next time slot); otherwise, the next active state (e.g., the active state in the next time slot) will be the state pointed by the failure transition of state s and then input character c will be examined again in the next time slot.

The AC automaton just introduced above is an un-optimized version. There is a second, optimized version. An advantage of the un-optimized version is that an AC automaton with N states has only N−1 goto transitions and N−1 failure transitions. Consequently, the storage complexity of transitions is relatively low. For an input stream with length L, the number of state transitions to be made during matching in the worst cast is 2L.

The optimized version of an AC automaton is referred to as a "Deterministic Finite Automaton" (DFA). An optimized version of an AC automaton may be constructed based on the un-optimized version by (1) adding goto transitions for every character from every state and (2) removing the failure transitions. Compared to the un-optimized version, the optimized version only needs to make one state transition for each input character. Therefore, its worst-case throughput is twice that of the un-optimized version. Unfortunately, however, the optimized version has a huge memory cost, since each state has 256 goto transitions corresponding to 256 (ASCII) characters.

In the following, unless specifically noted, the term "AC automaton" will denote its un-optimized version, while the term "AC-DFA" will denote the optimized version. For simplicity, the word "transition" is used to refer a goto transition (as opposed to a failure transition) unless it is clear from the context that a failure transition is intended.

§1.2.2 Multi-String Matching Schemes Using The AC Automoton

With rule sets continuing to grow quickly, implementing an AC automaton with a small memory without sacrificing performance becomes a major challenge in NIDS design. There are many schemes that could be used to efficiently implement dense automatons. (An automaton may be referred to as a "dense automaton" if the ratio of its total transition number to its total state number is close to 256.) A two-dimensional direct-indexed table may be used to store all the transitions, where each row corresponds to a state, each column corresponds to a symbol, and the intersection between each row and each column stores a row ID of the next hop state.

In order to reduce memory cost, HEXA (See, e.g., the reference S. Kumar, J. Turner, P. Crowley, and M. Mitzenmacher, "HEXA: Compact Data Structures for Faster Packet Processing," *Proceedings of the Fifteenth IEEE International Conference on Network Protocols* (ICNP), pp. 246-255 (2007), incorporated herein by reference.) was proposed to reduce the number of bits stored in each field of the two-dimensional table using the historical scanning information carried by the input stream. Although a two-dimensional table works fine for a dense automaton, it is not a good solution to implement a sparse automaton (such as AC automaton, which has the transition-to-state ratio normally between 1 and 2), because of the memory wasted by the non-existing transitions.

Besides the two-dimensional table, an automaton may be implemented by storing each state as a whole data structure, and connecting parent and child states by pointers in the parent states. However, the wide distribution of state sizes (i.e., the numbers of transitions of states) on the AC automaton makes the design of a compact state structure challenging.

FIG. 2 illustrates the distribution of state sizes on the AC automaton based on the Snort rule set. Notice that the distribution is quite wide and unbalanced, with most states having smaller sizes. Consequently, it is challenging to design a compact state structure storing pointers pointing to the child states.

Using a hash table to implement the sparse automaton (such as AC automaton, for example) is advantageous because non-existing transitions needn't be stored, and the complicated state structure needn't be kept. Compared to other AC automaton implementation schemes, such as bit-map-compression AC and path-compression AC (Recall, e.g., the article N. Tuck, T. Sherwood, B. Calder, and G. Varghese, "Deterministic Memory-Efficient String Matching Algorithms for Intrusion Detection," *IEEE INFOCOM* (2004)) for example, storing transitions directly in a hash table can avoid unnecessary memory waste, and simplify the process of making a transition decision.

The main challenge involved in hash table design is avoiding hash collisions. Hash collisions might increase memory access times for each transition decision and cause instability of the processing speed. Furthermore, hash collisions might be exploited by attackers to degrade system performance. The paper, J. van Lunteren, "High-Performance Pattern-Matching for Intrusion Detection," *IEEE INFOCOM* (2006) proposes a BFSM-based pattern-matching ("BFPM") technique that uses a hash table construction scheme named Balanced Routing Table ("BART") (See, e.g., the reference J. van Lunteren and A. P. J. Engbersen, "Fast and Scalable Packet Classification," *IEEE Journal of Selected Areas in Communications*, vol. 21, no. 4, pp. 560-571, May (2003), incorporated herein by reference.) to limit the maximum number of collisions of any hash index by a configurable bound P. (P=4 is used in the reference J. van Lunteren, "High-Performance Pattern-Matching for Intrusion Detection," *IEEE INFOCOM* (2006).) When a transition decision is made, P transitions are read out from the same entry of the hash table simultaneously. After P parallel comparisons, the correct transition can be decided. Unfortunately, however, storing multiple transitions in each entry increases the memory bus width and wastes memory space. Furthermore, P comparisons required for each transition decrease the scheme's efficiency in software implementation.

Therefore, an efficient perfect hashing scheme for generating a sparse automaton (such as an AC automaton for example) is desirable in high-performance NIDS design. Although there are many perfect hashing and alternative algorithms available in literature, most of them require multiple memory accesses to generate the hash index (traversing a tree structure) (See, e.g., the references: N. S. Artan and H. J. Chao, "Tribica: Trie Bitmap Content Analyzer for High-Speed Network Intrusion Detection," *IEEE INFOCOM* (2007); and N. S. Artan, M. Bando, and H. J. Chao, "Boundary Hash for Memory-Efficient Deep Packet Inspection," *IEEE International Conference on Communications* (*ICC* 2008) (Beijing, PRC, May 19-23, 2008), each incorporated herein by reference.), or need more than one memory access in the worst case to get the correct hash index for a hash table lookup (See, e.g., the references: R. Pagh and F. F. Rodler, "Cuckoo Hashing," *ESA* (2001), S. Kumar, J. Turner, and P. Crowley, "Peacock Hashing: Deterministic and Updatable Hashing for High Performance Networking," *IEEE INFOCOM* (2008); and F. Bonomi, M. Mitzenmacher, R. Panigrahy, S. Singh, and G. Varghese, "Beyond Bloom Filters: From Approximate Membership Checks to Approximate State Machines," *ACM SIGCOMM* (2006), each incorporated herein by reference.) Due to the dependency between two contiguous transitions made on the automaton (without the new current state information, the next transition cannot be made), one hash query can start only after the previous hash query returns a new current state ID. That is, hash queries are performed in series. The time required to perform one hash query is equal to the sum of (1) the time for generating the hash index (i.e., the result of the hash calculation(s)) and (2) the time accessing the hash table. (Given a hash key to be searched in the hash table, we need to first use the hash key as the input parameter to do a hash calculation (using a hash function, for example), and the result of the hash calculation (so called hash index) is the location of the hash table storing the desired hash key. Normally, the hash function is pre-determined.) Therefore, if the hash unit takes too much time generating the hash index or accessing the hash table, the matching speed of the system will be degraded.

§1.2.2.1 Memory Optimization of AHO-Corasick Automaton

Many techniques seeking to reduce the memory cost of AC automaton and AC-DFA have been proposed in literature.

(See, e.g., the references: J. van Lunteren, "High-Performance Pattern-Matching for Intrusion Detection," *IEEE INFOCOM* (2006); N. Tuck, T. Sherwood, B. Calder, and G. Varghese, "Deterministic Memory-Efficient String Matching Algorithms for Intrusion Detection," *IEEE INFOCOM* (2004); T. Song, W. Zhang, D. Wang, and Y. Xue, "A Memory Efficient Multiple Pattern Matching Architecture for Network Security," *IEEE INFOCOM* (2008); and L. Tan, T. Sherwood, "A High Throughput String Matching Architecture for Intrusion Detection and Prevention," *32nd Annual International Symposium on Computer Architecture, ISCA* (2005) each incorporated herein by reference.) In the paper Tuck et al. (N. Tuck, T. Sherwood, B. Calder, and G. Varghese, "Deterministic Memory-Efficient String Matching Algorithms for Intrusion Detection," *IEEE INFOCOM* (2004), incorporated herein by reference.), bitmap compression and path compression are applied to an AC automaton to avoid storing non-existing transitions, thereby reducing memory costs. The paper Tan et al. (L. Tan, T. Sherwood, "A High Throughput String Matching Architecture for Intrusion Detection and Prevention," *32nd Annual International Symposium on Computer Architecture, ISCA* (2005), incorporated herein by reference) proposes an approach which bit-splits an AC-DFA into several small AC-DFAs, thereby reducing the total memory requirement. The papers Song et al. (T. Song, W. Zhang, D. Wang, and Y. Xue, "A Memory Efficient Multiple Pattern Matching Architecture for Network Security," *IEEE INFOCOM* (2008)) and Lunteren (J. van Lunteren, "High-Performance Pattern-Matching for Intrusion Detection," *IEEE INFOCOM* (2006)) noted that a large fraction of transitions on an AC-DFA are backward to states at the first three levels (the root state is at level 1). Based on this observation, the Lunteren paper proposes removing transitions backward to the first two levels by storing them in a separate 256-entry table. The Song paper (T. Song, W. Zhang, D. Wang, and Y. Xue, "A Memory Efficient Multiple Pattern Matching Architecture for Network Security," *IEEE INFOCOM* (2008) proposes a Cached Deterministic Finite Automate ("CDFA") model, based on which backward transitions to states at level 3 can also be removed. The main idea of CDFA is to maintain more than one active state in AC-DFA (one at the root state, one at states at level 2, and one at states at other levels). It has been shown that after eliminating backward transitions to states at the first three levels, the number of transitions of an AC-DFA is approximately equal to the number of transitions of an AC automaton. Furthermore, it is observed that the total number of transitions could be significantly reduced if the rule set is partitioned into multiple subsets, and implemented by multiple small AC-DFAs. (See, e.g., the articles: J. van Lunteren, "High-Performance Pattern-Matching for Intrusion Detection," *IEEE INFOCOM* (2006); and T. Song, W. Zhang, D. Wang, and Y. Xue, "A Memory Efficient Multiple Pattern Matching Architecture for Network Security," *IEEE INFOCOM* (2008).)

Besides the memory optimization, other research work focuses on accelerating the processing speed of AC automaton/AC-DFA. (Recall, e.g., the articles: S. Dharmapurikar and J. W. Lockwood, "Fast and Scalable Pattern Matching for Network Intrusion Detection Systems," *IEEE Journal of Selected Areas in Communications*, Vol. 24, No. 10 (2006); H. Lu, K. Zheng, B. Liu, X. Zhang, and Y. Liu, "A Memory-Efficient Parallel String Matching Architecture for High-Speed Intrusion Detection," *IEEE Journal of Selected Areas in Communications*, Vol. 24, No. 10 (2006); and N. Hua, H. Song, T. V. Lakshman, "Variable-Stride Multi-Pattern Matching For Scalable Deep Packet Inspection", *IEEE INFOCOM* (2009).)

§1.2.3 Other Multi-String Matching Schemes

Researchers have proposed multi-string matching schemes that don't rely on an AC automaton or an AC-DFA. For example, the paper Yu et al. (F. Yu, R. H. Katz, and T. V. Lakshman, "Gigabit Rate Packet Pattern-Matching Using TCAM," *Proceedings of the Fifteenth IEEE International Conference on Network Protocols (ICNP)* (2004), incorporated herein by reference.) proposes a gigabit rate multistring matching scheme based on a Ternary Content-Addressable Memory ("TCAM"). The paper Piyachon and Luo (P. Piyachon and Y. Luo, "Efficient Memory Utilization On Network Processors for Deep Packet Inspection," *Symposium on Architecture for Networking and Communications Systems (ANCS)* (2006), incorporated herein by reference.) proposes a sophisticated memory model for multi-string matching implementation based on Network Processors ("NPs"). In addition, there are many field programmable gate array ("FPGA") based schemes proposed for multi-string matching (See, e.g., the references: Z. K. Baker, V. K. Prasanna, "High-Throughput Linked-Pattern Matching for Intrusion Detection Systems," *Symposium on Architecture for Networking and Communications Systems (ANCS)* (October 2005); I. Sourdis, D. N. Pnevmatikatos, and S. Vassiliadis, "Scalable Multigigabit Pattern Matching for Packet Inspection," *IEEE Trans. VLSI Syst.*, Vol. 16, No. 2, pp. 156-166 (2008); and Y.-H. E. Yang and V. K. Prasanna, "Memory-Efficient Pipelined Architecture for Large-Scale String Matching," *17th Annual IEEE FCCM* April (2009), each incorporated herein by reference.) which map the rule set directly to the pure logic of FPGAs, and can achieve high performance. One limitation of FPGA-based schemes is that when rules are changed, it takes considerable time to re-synthesize the design and reprogram the FPGA.

§1.2.4 Desired Characteristics of a Multi-String Matching Scheme

In view of the foregoing, there is a need to provide a multi-string matching algorithm which (1) avoids hash collisions (that is, is a perfect hash table), (2) uses memory efficiently, (3) requires no memory access to generate the hash index, and/or (4) guarantees to return the hash result within the time of exact one memory access.

Each of the foregoing articles (in this section 1.2) is incorporated herein by reference.

§2. SUMMARY OF THE INVENTION

Embodiments consistent with the present invention provide exemplary methods for inserting a representation of a new rule, defined as a set of at least one new transition corresponding to the new rule (each of the at least one new transition of the set being from a source state to a destination state) into a perfect hash table which includes previously placed transitions (each of the previously placed transitions being from a source state to a destination state) to generate an updated perfect hash table. Such exemplary methods may do so by, for each of the at least one new transition of the new rule: (a) hashing the new transition; (b) determining whether the hashed new transition conflicts with any of the previously placed transitions; (c) responsive to a determination that there is no conflict inserting the hashed new transition into the perfect hash table, and otherwise, responsive to a determination that the hashed new transition conflicts with any of the previously placed transitions, (1) determining whether or not the state associated with the new transition has more transitions than a state associated with the conflicting transition, and (2) responsive to a determination that the state associated with the new transition has equal or more transitions than the state associated with the conflicting transition, (A) removing from the hash table any transitions of the state associated with the conflicting transition, (B) placing the hashed new transition into the perfect hash table, and (C) re-placing the removed transitions into the hash table such that the hash table is maintained as a perfect hash table, otherwise, responsive to a determination that the state associated with the new transition has fewer transitions than the state associated with the conflicting transition, (A) removing any previously placed transitions of the state associated with the new transition, and (B) re-placing the transitions of the state associated with the new transition into the hash table such that the hash table is maintained as a perfect hash table.

In at least some embodiments consistent with the present invention, the method may be performed by at least one processor executing stored processor executable instructions.

§3. BRIEF DESCRIPTION OF THE DRAWINGS

FIG. 15 illustrates a table including dependent edge sets of nodes after the bipartite graph of FIG. 14 is decomposed in a manner consistent with the present invention.

FIGS. 20a and 20b illustrate how the insertion of a hashed transition may kick-out previously stored transitions.

§4. DETAILED DESCRIPTION

Figure 1:
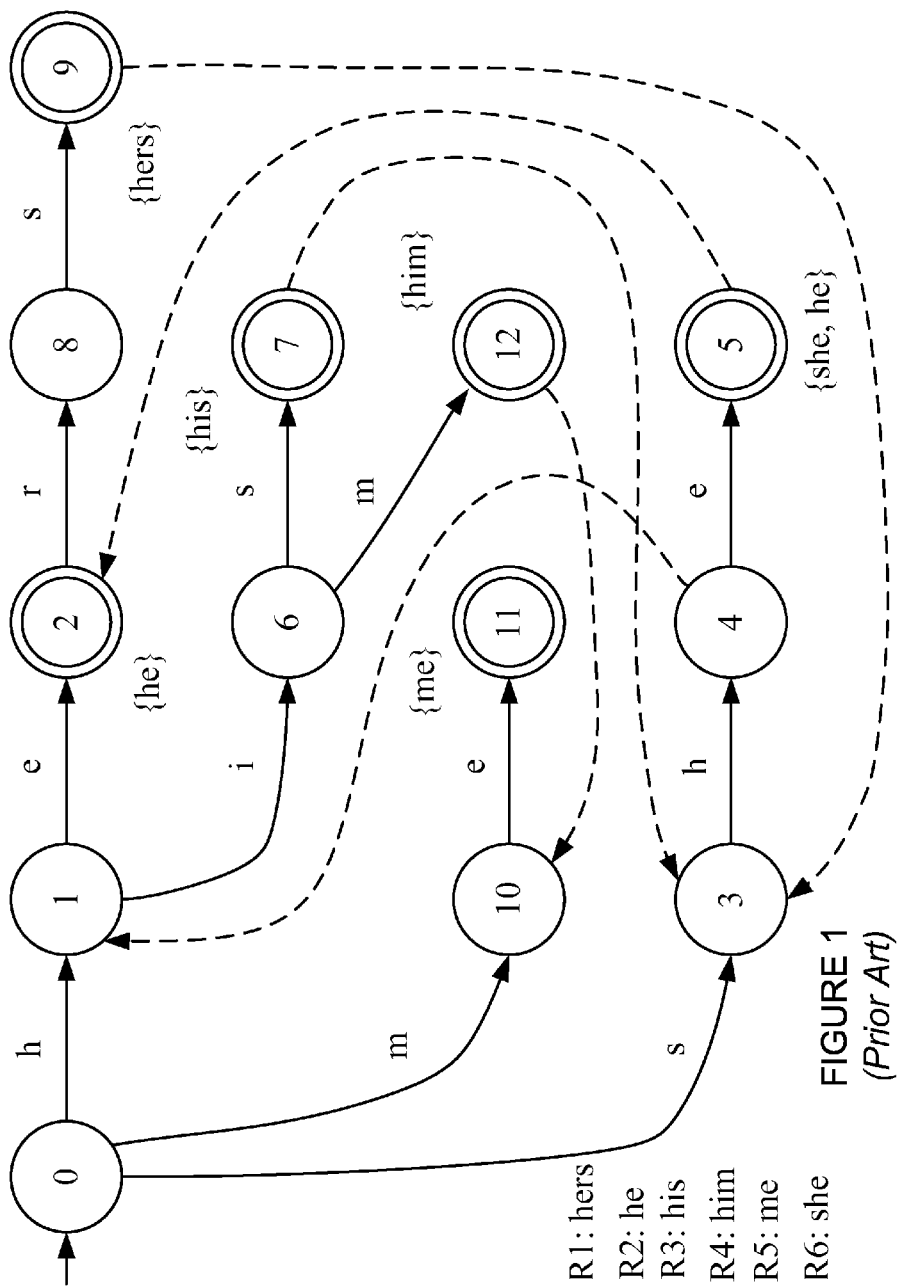
FIG. 1 illustrates an AC automaton for exemplary rule set {hers, he, his, him, me, she}.

The present invention may involve novel methods, apparatus, message formats, and/or data structures to generate, progressively, a perfect hash data structure, and/or architecture using the generated perfect hash data structure, for determining whether or not an arbitrary-length bit string matches one of a number of known arbitrary-length bit strings. The present invention may also involve novel methods, apparatus, message formats, and/or data structures to update a previously generated perfect hash data structure. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Terminology Used

In this application, the following terms are used. A sparse automaton (such as an AC automaton for example) is formally defined as a 5-tuple=(Q, $\Sigma$, g, f, T), which consists of:

A finite set of states, Q, where each state is represented by a number ranging from 0 to $|Q|-1$, among which 0 is the start (root) state;

A finite input character set, $\Sigma$, called alphabet;

A set of accepting states, $T \subseteq Q$;

A goto transition function that, g: $Q \times \Sigma \rightarrow Q \cup \{fail\}$; and A failure function that, $f: Q-\{0\} \rightarrow Q$.

A hash table is a 3-tuple H={K, h, S}, consisting of:

A set of keys, K, where each key is used as the input of the hash function to obtain the index of the hash table;

A table S, which has at least |K| entries, i.e., $|S| \geq |K|$; and

A hash function that, h: K→N, where N is the set of natural numbers from 0 to $|S|-1$; the hash function is called a perfect hash function if for $\forall \alpha$, b$\in$ K and $\alpha \neq$ b, then h($\alpha$)$\neq$h(b).

In the following, h($\alpha$) is called the hash index of key $\alpha$.

A "perfect hash table" is a hash table in which the hash function associated with the hash table is a perfect hash function.

The "load factor" of a hash table is defined as $\rho=|K|/|S|$, which indicates how full the hash table is. Normally, a larger $\rho$ implies a higher probability of hash collisions.

Unless stated otherwise, it will be assumed that the hash function used in the construction of the hash table is randomly selected from a universal hash function family and is uniform hashing (that is, each hash key is equally likely to hash into any of the $|S|$ entries of the hash table, independently of where any other key has hashed to). However, this assumption is not necessary for embodiments consistent with the present invention.

§4.2 Perfect Hash Table Construction

Embodiments consistent with the present invention store all the transitions of a sparse (e.g., AC) automaton in a perfect hash table. In at least some exemplary embodiments, each transition on the sparse automaton takes one entry of the hash table. The hash table entry may be of the form: "(source state ID, input character)→destined state ID", where "(source state ID, input character)" stands for the concatenation of "source state ID" and "input character" in binary mode, and works as the key of the hash function, while "destined state ID" is the result sought to be returned from the hash table access.

Under this section, progressive perfect hashing is described in §4.2.1, two-dimensional progressive perfect hashing is described in §4.2.2, and N-dimensional (where N>2) progressive perfect hashing is described in §4.2.3.

§4.2.1 PROGRESSIVE PERFECT HASHING ($P^2$-Hashing)

The present inventors made two observations used in their perfect hash table construction processes. The first observation concerns the hash function. More specifically, if a hash collision occurs when placement of a new key into the hash table is attempted, the collision might be avoided if the value of the key can be changed. This first observation is based on the fact that the hash index of a key depends only on the hash function and the value of the key. If the value of the key is changed, the hash index is also changed. Accordingly, the original hash collision may be avoided. The second observation is that the ID of each state of AC automaton could be named as any value, as long as no two states are named with the same value.

Based on these two observations, the present inventors developed a process called Progressive Perfect Hash ($P^2$-Hashing) to place the transitions of a sparse automaton in a hash table without collision. To better illustrate $P^2$-Hashing, in this section, only goto transitions are stored. Storing goto transitions, failure transitions, and rule IDs is described later.

Figure 3:
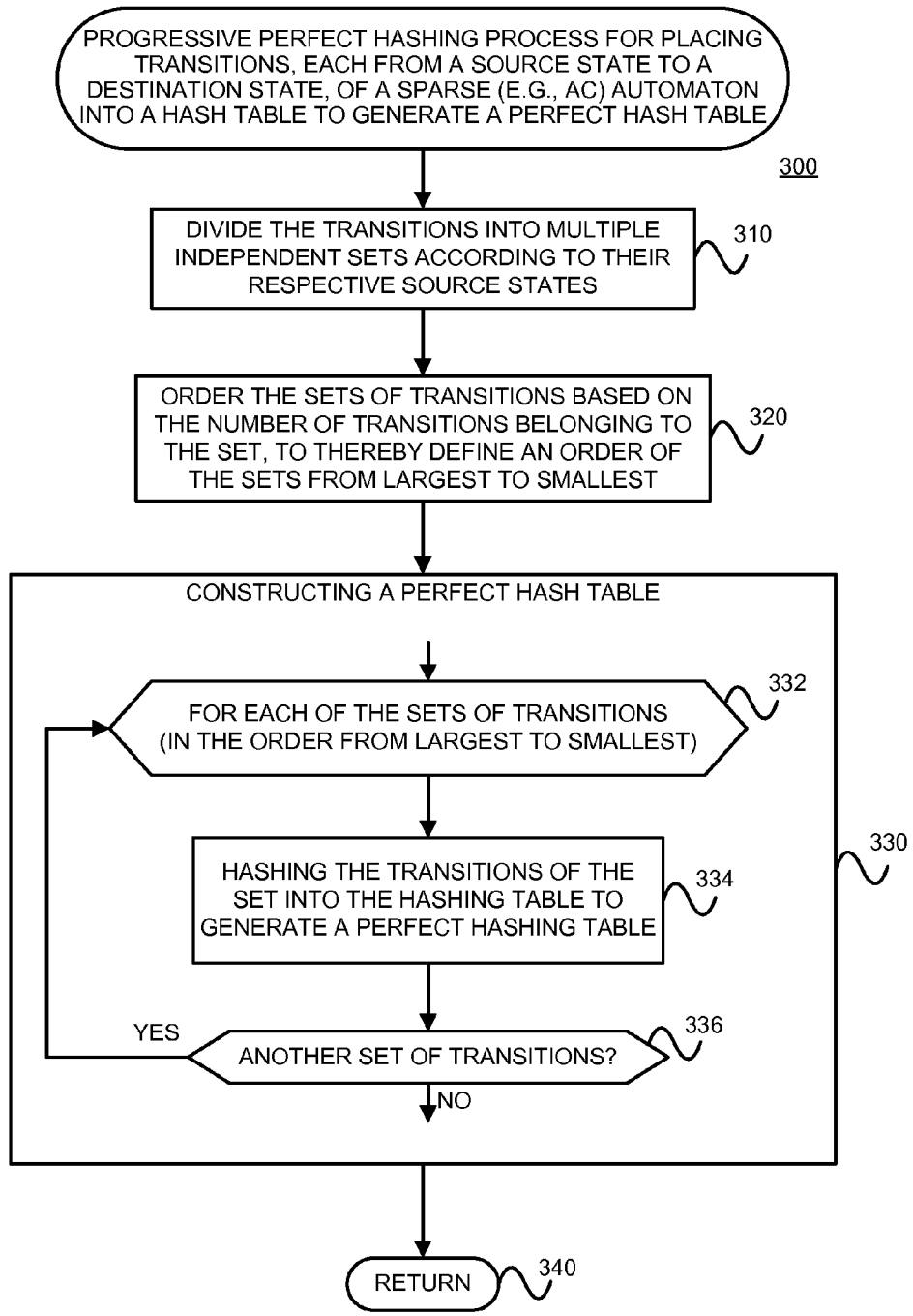
FIG. 3 is a flow diagram of an exemplary method which may be used to place transitions, from a source state of an automaton to a destination state of the automaton, into a hash table to generate a perfect hash table, in a manner consistent with the present invention.

FIG. 3 is a flow diagram of an exemplary method 300 which may be used to place transitions, each from a source state of a sparse (e.g., AC) automaton to a destination state of the automaton, into a hash table to generate a perfect hash table, in a manner consistent with the present invention. The transitions are first divided into multiple independent sets according to their respective source states. (Block 310) Then, the sets of transitions are ordered based on the number of transitions belonging to the set, thereby defining an order of the sets from largest to smallest. (Block 320) Finally, a perfect hash table is contracted. (Block 330) For example, for each of the sets of transitions, in the order from largest to smallest (Loop 332-336), the transitions of the set are hashed into the hashing table to generate a perfect hashing table (Block 334). The method 300 is then left. (Node 340)

As can be appreciated, $P^2$-Hashing divides the goto transitions of a given automaton into multiple independent sets according to their source states (Recall, e.g., 310 and 320 of FIG. 3), and places these transition sets in the hash table in decreasing order of their sizes (Recall, e.g., 330 of FIG. 3).

Figure 4:
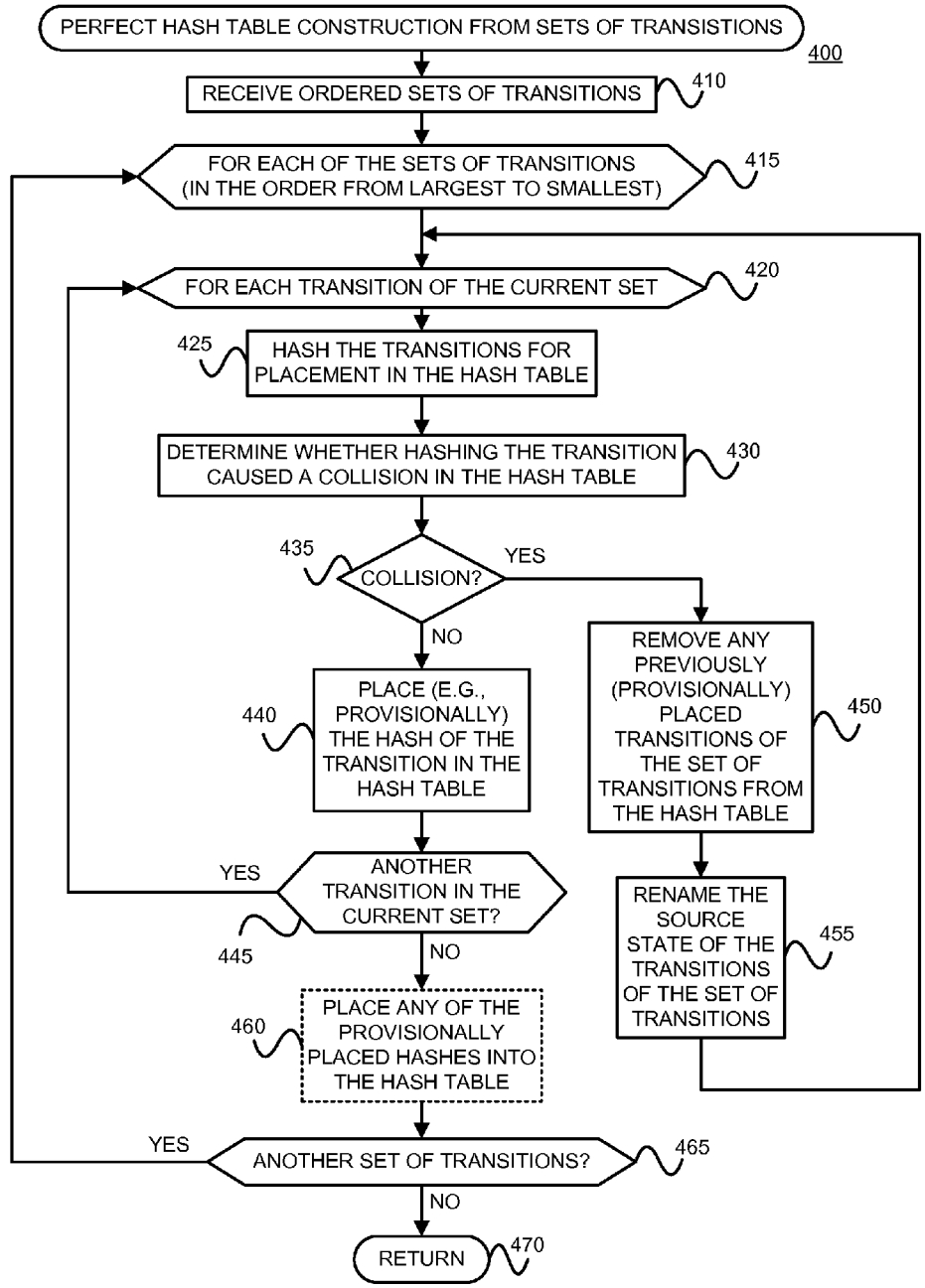
FIG. 4 is a flow diagram of an exemplary method which may be used to construct a perfect hash table from sets of transitions, in a manner consistent with the present invention.

Referring back to block 330 of FIG. 3, FIG. 4 is a flow diagram of an exemplary method 400 which may be used to construct a perfect hash table from sets of transitions, in a manner consistent with the present invention. The ordered set of transitions is received. (Block 410) Then a number of acts are performed for each of the sets of transitions, in the order from largest to smallest. (Loop 415-460) More specifically, for each transition of the set (Loop 420-445), while there is no collision (Note break out of Loop 420-445 if there is a collision.), the transition is hashed for placement in the hash table (Block 425) and whether hashing the transition caused a collision is determined (Block 430). Responsive to a determination that hashing the transition caused a collision (YES branch of Decision Block 435), any previously (e.g., provisionally) placed transitions of the set of transitions are removed from the hash table (Block 450), the source state of the transitions of the set of transitions is renamed (Block 455), and the method 400 breaks out of the Loop 420-445 to restart at 420. Otherwise, responsive to a determination that hashing the transition did not cause a collision (NO branch of Decision Block 435), the hash of the transition is (e.g., provisionally) placed in the hash table (Block 440), and if there are any other transitions in the current set, the method 400 loops back to 420, while if there are no other transitions in the current set, (any provisionally placed transitions are placed into the hash table (Block 460) and) it is determined if there is another set of transitions to be processed (465). If, so, the next set is processed (Loop 415-465); otherwise, the method 400 is left (Node 470).

As can be appreciated, the transitions of each set are placed into the hash table as a whole. Any hash collision occurring during the placement of a set causes the set placement failure (Recall, e.g., 435 of FIG. 4), and the already-placed transitions in this set are removed from the hash table (Recall, e.g., 450 of FIG. 4), the source state shared by transitions in this set is renamed (Recall, e.g., 455 of FIG. 4), and another set placement trial is performed (Recall, e.g., breaking out from, and restarting, Loop 420-445 of FIG. 4). The renaming operation repeats until a successful set placement is achieved, and then the placement of the next transition set starts. (Recall, e.g., 440, 445, 460 and 465 of FIG. 4.)

Figures 5, 6:
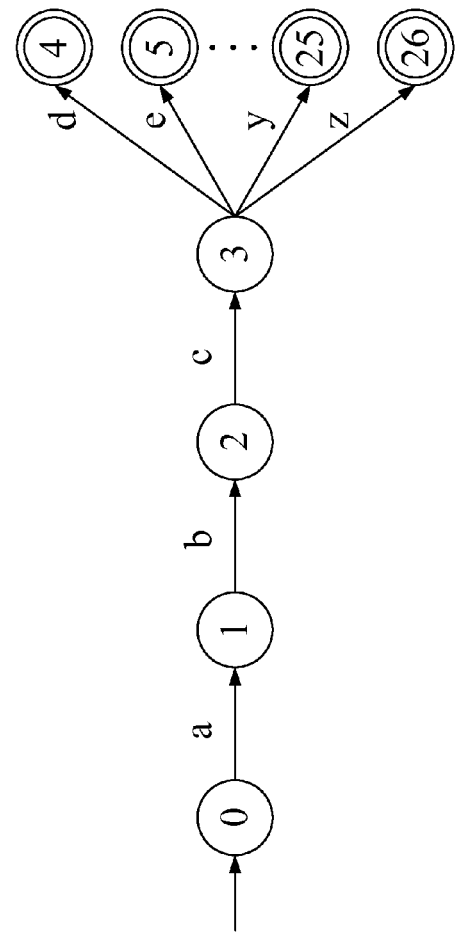
FIG. 5 illustrates a table including transition sets of source states of the AC automaton of FIG. 1, consistent with the present invention.
FIG. 6 illustrates an AC automaton including a set of rules with the same prefix, consistent with the present invention.

Consider the AC automaton shown in FIG. 1, which has 12 transitions. The transition sets associated with source states are shown in FIG. 5. Suppose these transitions are to be stored into a perfect hash table with 12 entries. With $P^2$-Hashing, the transition set associated with state 0 is placed first, since it has the most transitions. It should be appreciated that the success probability of placing all three transitions in this set into the hash table without collision is $$\frac{12}{12} \cdot \frac{11}{12} \cdot \frac{10}{12}.$$

Suppose the transition set associated with state 4 is the last set to be placed. Its success probability is $$\frac{1}{12}.$$

It should be appreciated that the sequence of set placements has a great impact on their success probabilities. Considering the foregoing example again, if the transition set associated with state 0 were to be placed last, the success probability of a collision free placement of the transition set is only $$\frac{3}{12} \cdot \frac{2}{12} \cdot \frac{1}{12} = 0.0034.$$

The reason for this low success probability is that all transitions of each set must be placed simultaneously into the hash table without collision. If the largest transition set placement was attempted last (when the hash table is almost full), the success probability would become very low. That is why $P^2$-Hashing places larger transition sets into the hash table first.

Formally, the success probability of a set placement is determined by the current load factor of the hash table ($\rho$) and the number of transitions in the set (W), and could be approximately calculated with the following inequality:

$$P(\text{success of a set placement}) \leq (1-\rho)^W \qquad (1)$$

The success probability of a set placement determines the average number of state renamings required before a successful set placement. Suppose $\rho=0.5$, $W=10$, the success probability is less than 1/1024, which means that, on average, the state would have to be renamed 1024 times before achieving a successful set placement. Accordingly, the number of bits to encode the state IDs is expected to be 10. If W increases to 20, on average, the state would have been renamed 1 million times before achieving a successful set placement. In this case, the number of bits used to represent state IDs increases to 20.

If both W and $\rho$ happen to be large during the placement of a transition set, the performance of the $P^2$-Hashing algorithm would become very poor, not only because of the long running time of state renamings (during each state renaming, many transitions may need to be re-placed), but also because of the high storage cost required by the long state IDs. Fortunately, AC automatons are normally sparse automatons, especially for large rule sets. Recall from FIG. 2 that only a few of states have relatively large number of goto transitions (say more than 10 goto transitions); 99% of states have only three or fewer transitions. By placing large sets first, the situation in which both W and $\rho$ are large can be avoided.

§4.2.2 Two-Dimensional Progressive Perfect Hashing (2D $P^2$-Hashing)

Although the $P^2$-Hashing process provides important improvements over known methods of encoding automatons, it does not handle situations in which a few states take the majority of the total transitions (especially for small rule sets) very well. Consider, for example, the AC automaton shown in FIG. 6, which includes 23 rules with the same length. All of these rules have the same prefix of "abc." Suppose $P^2$-Hashing is used to place the 26 transitions of the AC automaton into a hash table with 28 entries. According to $P^2$-Hashing, the transition set associated with state "3" is placed first since it is the largest transition set with 23 transitions. However, the success probability of placing this transition set is $$\prod_{i=0}^{22} \frac{28-i}{28} \approx 1.3 \times 10^{-6}.$$

That means, on average, the state "3" would have to be renamed $10^6$ times to achieve a successful set placement, and use 20 bits to name each state. Please note that ideally, 27 states of the AC automaton only require 5 bits for unique representation. (For simplicity, failure transitions are not shown (here all to the root state) in FIG. 6.)

The $P^2$-Hashing process described above changes the hash indexes of transitions by renaming their source states. The present inventors have recognized that the input key of the hash function can be considered to include two dimensions: (1) source state ID; and (2) input character. The present inventors have also recognized the goal of changing hash indexes can be achieved by changing the value of either of these two dimensions. When the values of characters are changed, only a 256-entry character translation table is needed to record the new encoding of each character. Given this insight, the present inventors next sought to decide the sequence in which transitions should be placed into the hash table, and the dimensions of transitions that should be renamed when hash collisions occur during the placements. The main challenge involved in this process is that when a state or character is renamed, many transitions could be affected, including those already-placed transitions. The present inventors sought to avoid fluctuations in the hash table (due to repeatedly placing and removing transitions to and from the hash table). A second process, called a two-dimensional $P^2$-Hashing ("2D $P^2$-Hashing" for short) avoids this problem.

Figure 7:
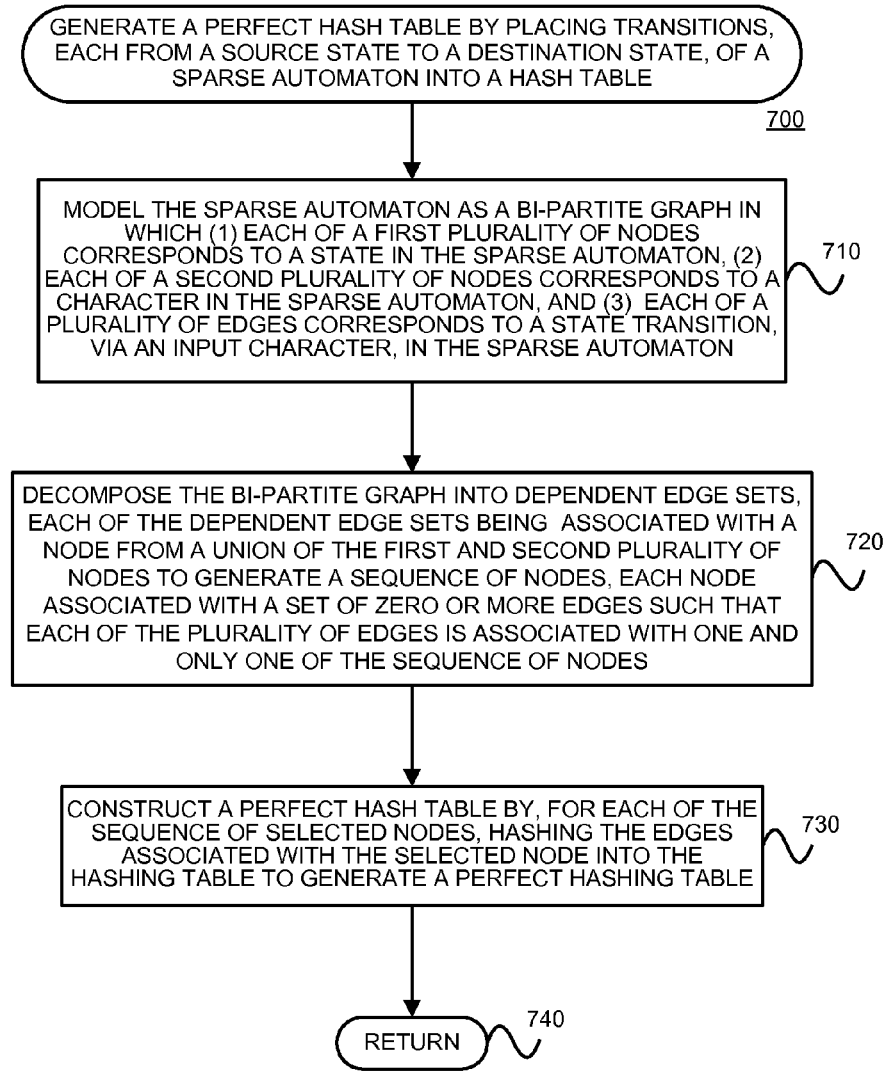
FIG. 7 is a flow diagram of an exemplary method which may be used to generate a perfect hash table, in a manner consistent with the present invention.

FIG. 7 is a flow diagram of an exemplary method 700 which may be used to generate a perfect hash table, in a manner consistent with the present invention. First, the sparse (e.g., AC) automaton is modeled as a bipartite graph in which (1) each of a first plurality of nodes corresponds to a state in the automaton, (2) each of a second plurality of nodes corresponds to a character in the automaton, and (3) each of a plurality of edges corresponds to a state transition, via an input character, in the automaton. (Block 710. See also, FIG. 10, described later.) The bipartite graph is then decomposed into dependent edge sets. Each of the dependent edge sets is associated with a node from a union of the first and second plurality of nodes to generate a sequence of nodes. Each node is associated with a set of zero or more edges such that each of the plurality of edges is associated with one and only one of the sequence of nodes. (Block 720. See also, FIG. 11, described later.) Finally, a perfect hash table is constructed by, for each of the sequence of selected nodes, hashing the edges associated with the selected node into the hashing table to generate a perfect hashing table (Block 730) before the method 700 is left (Node 740).

As can be appreciated from the foregoing, the 2D $P^2$-Hashing procedure includes three steps. In the first step, the automaton M=(Q, $\Sigma$, g, f, T) is modeled as a bipartite graph, which is formally defined as a 3-tuple B=(U, V, E), including: A first set of nodes, U; a second set of nodes, V; and a set of edges, E, where $\forall <u, v> \in E$ satisfies that $u \in U$, $v \in V$. (Recall, e.g., 710 of FIG. 7.) In this model, set U=Q, V=$\Sigma$, and let E={<q,c>|$\forall q \in Q$, $\forall c \in \Sigma$, that g(q,c)$\neq$fail}. In other words, each state in the (e.g., AC) automaton corresponds to a node in set U, each character in the (e.g., AC) automaton corresponds to a node in set V, and each transition in the automaton corresponds to an edge in set E. To better illustrate the scheme, nodes in first set U are called "state nodes," and nodes in second set V are called "character nodes." Storing transitions of the (e.g., AC) automaton in a perfect hash table is equivalent to storing edges of the bipartite graph in the perfect hash table, where the concatenation of u and v of each edge <u, v> is used as the key of the hash function.

Figures 10, 11:
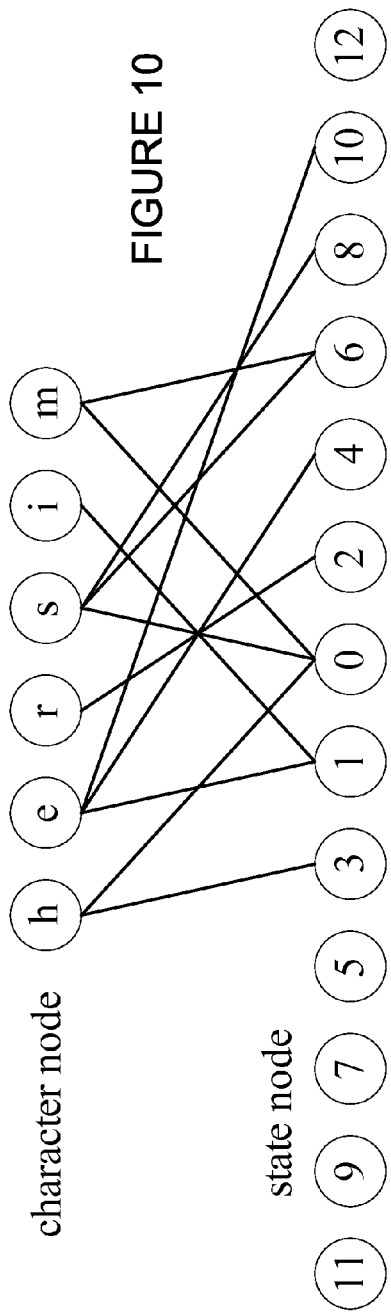
FIG. 10 is a bipartite graph model of the AC automaton of FIG. 1.
FIG. 11 illustrates a table including dependent edge sets of nodes after the bipartite graph of FIG. 10 is decomposed in a manner consistent with the present invention.

The bipartite graph model of the exemplary AC automaton of FIG. 1 is shown in FIG. 10. As shown, state node set U includes 13 nodes {0~12}, and character node set V includes 6 nodes {h, e, r, s, i, m}. Each edge in the bipartite graph of FIG. 10 represents a transition on the AC automaton. On the bipartite graph, the number of edges connected to each node reflects the potential impact of the node during the perfect hash table construction. More specifically, the more edges a node has, the more difficult it is to rename it such that a collision-free placement of all its connected edges is achieved.

In the second step of the 2D $P^2$-Hashing process, edges of the bipartite graph are decomposed into $|U|+|V|$ sorted edge sets (some sets could be empty), and each edge set is associated with a node in $U \cup V$. Each edge set is called the dependent edge set of its associated node. (Recall, e.g., block 720 of FIG. 7.)

Figure 8:
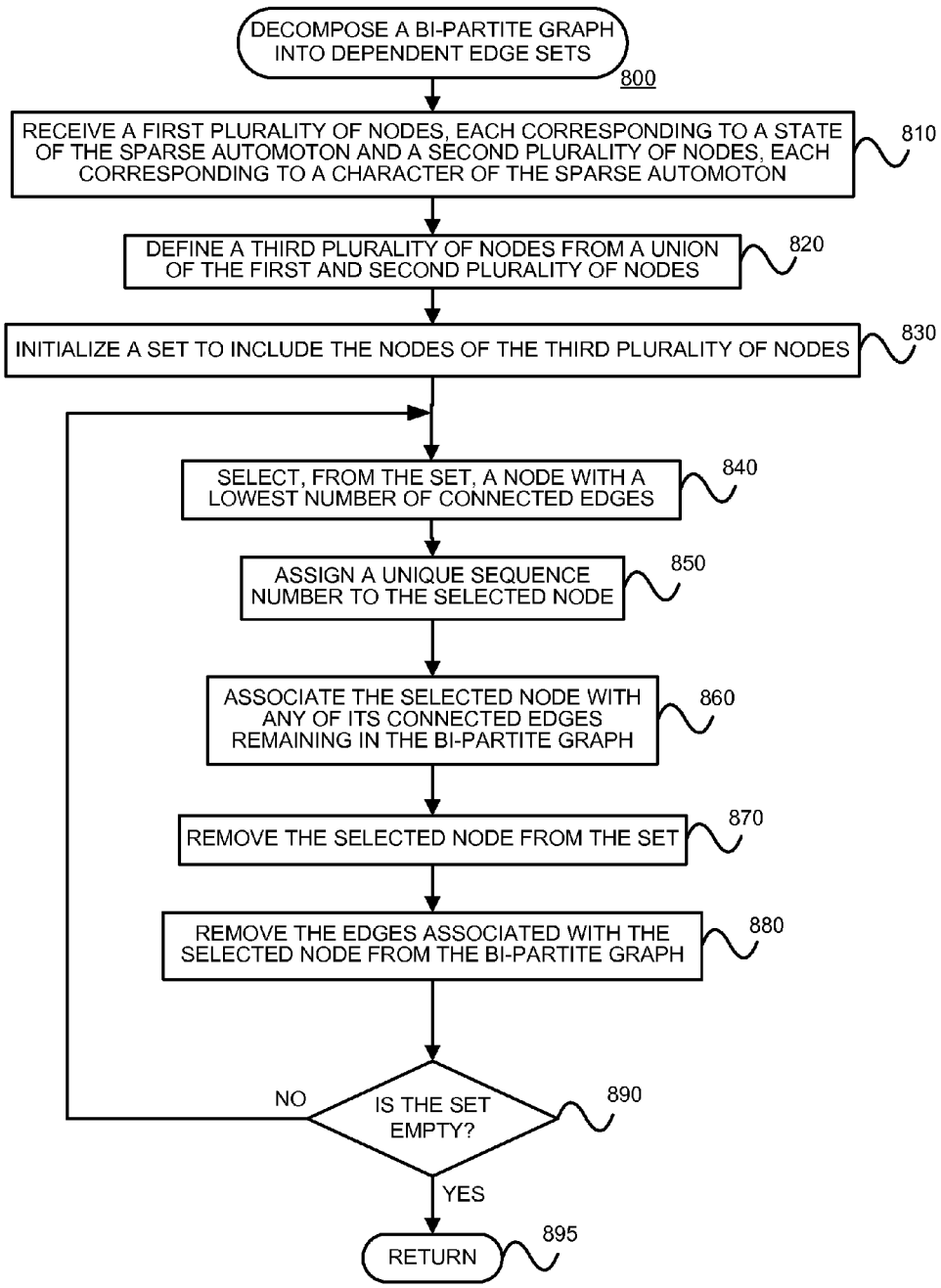
FIG. 8 is a flow diagram of an exemplary method which may be used to decompose a bi-partite graph into dependent edge sets, in a manner consistent with the present invention.

Referring back to block 720 of FIG. 7, FIG. 8 is a flow diagram of an exemplary method 800 which may be used to decompose a bipartite graph into dependent edge sets, in a manner consistent with the present invention. As shown in FIG. 8, a first plurality of nodes (each corresponding to a state of the sparse automaton) and a second plurality of nodes (each corresponding to a character of the sparse automaton) are received. (Block 810) A third plurality of nodes is defined from a union of the first and second plurality of nodes. (Block 820). A set is initialized to include the nodes of the third plurality of nodes. (Block 830) A node with a lowest number of connected edges is then selected from the set. (Block 840) A unique sequence number is assigned to the selected node. (Block 850) The selected node is associated with any of its connected edges remaining in the bipartite graph. (Block 860) The selected node is removed from the set (Block 870) and any edges associated with the selected node are removed from the bipartite graph (Block 880). As shown by decision block 890, blocks 840-880 of the method 800 are repeated until the set is empty. When the set is empty, the method 800 is left. (Node 895)

Referring back to block 850, the sequence number may be assigned to the selected nodes (edge sets) increasingly and continuously starting from 1 (e.g., the first node set is assigned 1, the second node set is assigned 2, etc.). The sequence number is used to define (record) the sequence in which the edge sets are to be placed in the hash table. When constructing the hash table, edge sets with a larger sequence number will be placed before edge sets with a smaller sequence number (i.e., in reverse order of the decomposition).

Pseudo code for bipartite graph decomposition in a manner consistent with the present invention is as follows:

---

Bipartite Graph Decomposition

Input:
   Bipartite graph B = (U, V, E);
Output:
   A sequence number N(v) for every node v
   ∈ U ∪ V;
   A dependent edge set D(v) for every node v ∈
   U ∪ V;
Algorithm:
   N(v) := NULL (∀ v ∈ U ∪ V);
   D(v) := NULL (∀ v ∈ U ∪ V);
   for (j := 1; j ≤ |U| + |V|; j ++) ;
   {
   Among all nodes in bipartite graph B, choose a
   node, say v, that has the least connected edges; if
   there are multiple qualified nodes, randomly
   select one;
   N(v) := j;
   D(v) :=the set of edges connected to node v;
   Remove node v and its connected edges from the
   bipartite graph B;
   }

---

As should be appreciated from the foregoing, the bipartite graph decomposition includes $|U|+|V|$ phases, and starts with all nodes unassociated. During each phase, among all nodes in the bipartite graph, a node (e.g., v) that has the fewest connected edges is chosen. (Recall, e.g., 840 of FIG. 8.) If there are multiple qualified nodes, one arbitrary node may be chosen. All edges connected to the chosen node (v) are allocated to node v's dependent edge set. (Recall, e.g., 860 of FIG. 8.) Chosen node (v) and its connected edges are then removed from the bipartite graph. (Recall, e.g., 870 and 880 of FIG. 8.)

After the bipartite graph decomposition is completed, each node will have been assigned a dependent edge set and a sequence number. For the bipartite graph in FIG. 10, the dependent edge sets of nodes and the sequence in which they are removed from the bipartite graph are shown in FIG. 11.

The complexity of the bipartite graph decomposition is linear to the number of edges on the bipartite graph, although a node with the fewest connected edges is selected in each phase. This is due to the following properties of the AC automaton:

The total number of character nodes is at most 256;
   Although there are many state nodes, the number of edges connected to each state node ranges only from 0 to 256; and
   Each time when a node is removed from the bipartite graph, the numbers of edges of its connected nodes are decreased by only one.

According to these prosperities, it is possible to maintain a sorted list for character nodes and 257 linked lists for state nodes with different numbers of connected edges. Based on the 258 lists, the number of operations required in each phase is proportional to the number of edges removed in the phase.

In the third step of the exemplary 2D $P^2$-Hashing process, edge sets obtained in the second step are placed into the hash table in reverse order of their removals from the bipartite graph (i.e., in a decreasing order of their sequence). In other words, the edge set removed from the bipartite graph last is the first placed into the hash table. (Recall, e.g., 730 of FIG. 7.)

Figure 9:
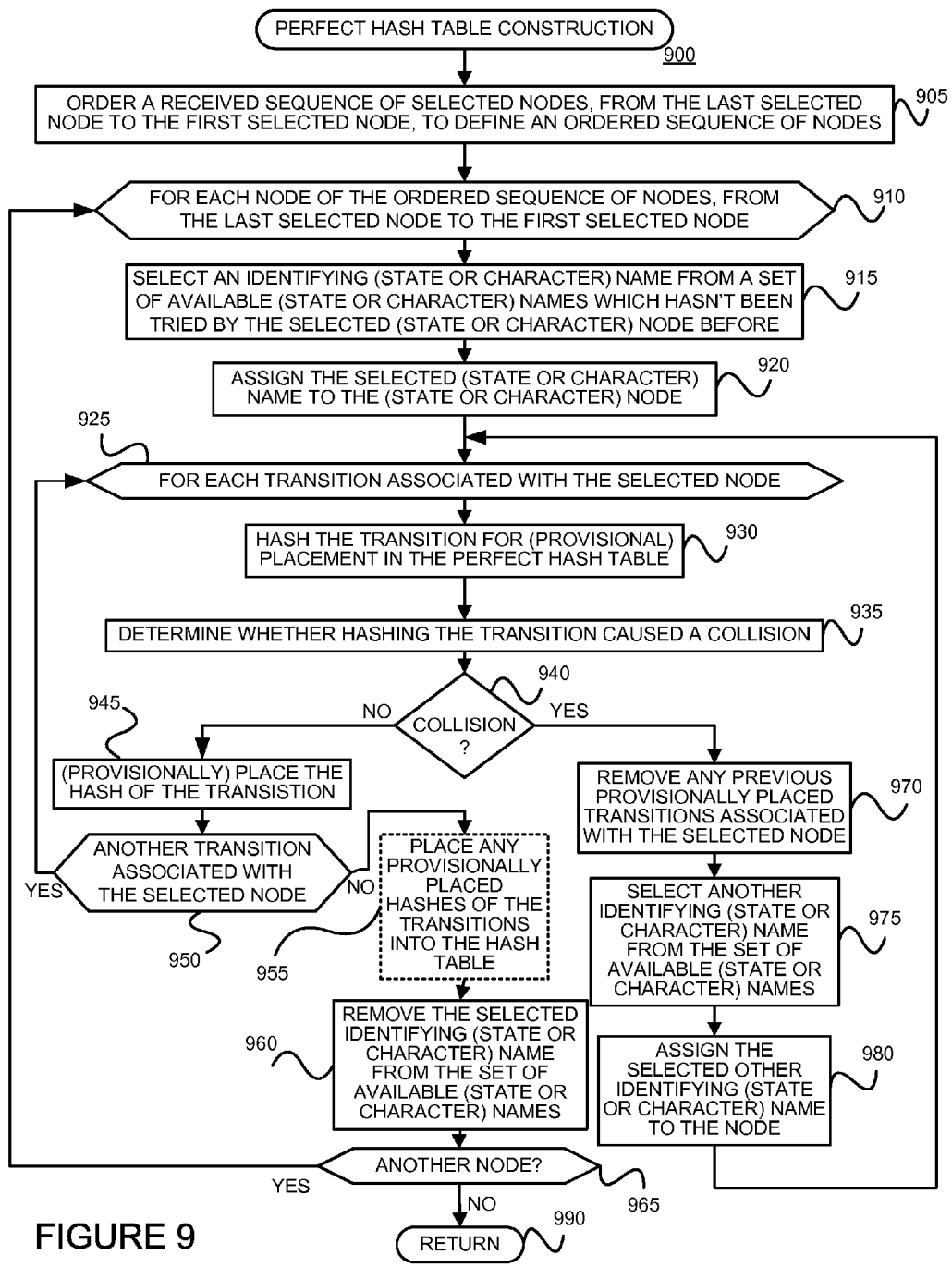
FIG. 9 is a flow diagram of an exemplary method which may be used to construct a perfect hash table, in a manner consistent with the present invention.

FIG. 9 is a flow diagram of an exemplary method 900 which may be used to construct a perfect hash table, in a manner consistent with the present invention. If not already done in the bipartite graph decomposition, the selected nodes are ordered, from the last selected node to the first selected node, to define an ordered sequence of nodes. (Block 905) A number of acts are then performed for each node of the ordered sequence of nodes, from the last selected node to the first selected node. (Loop 910-965) More specifically, an identifying state name is selected from a set of available state names if the node is a state node, and otherwise an identifying character name from a set of available character names if the node is a character node. (Block 915) The selected name is assigned to the node. (Block 920) Next, a number of acts are performed for each of the transitions of the selected node (Loop 925-950), while there is no collision (NO condition of 940. Note break out of Loop 925-950 if there is a collision.), the transition is hashed for (e.g., provisional) placement in the hash table (Block 930) and whether hashing the transition (e.g., would cause, or) caused a collision is determined (Block 935). Responsive to a determination that hashing the transition did not cause a collision (NO condition of 940), the hash of the transition is (e.g., provisionally) placed (Block 945) and is it determined whether or not there are any other transitions associated with the selected node (950). If so, the method 900 branches back to 925 to process the next transition; otherwise (i.e., upon (e.g., provisional) placement of all transitions of the selected node), any provisionally placed transitions of the selected node are placed into the hash table (Block 955) and the last selected state name from the set of available state names is removed if the selected node is a state node, or the last selected character name is removed from the set of available character names if the selected node is a character node (Block 960). Then, it is determined if there is another node (965). If so, the method 900 branches back to 910; otherwise the method 900 is left (Node 990).

Referring back to 940, responsive to a determination that hashing the transition caused a collision (YES condition of 940), any previously (e.g., provisionally) placed transitions associated with the selected node are removed (e.g., from the hash table if they were placed) (Block 970), another identifying state name is selected from the set of available state names if the node is a state node, or another identifying character name is selected from the set of available character names if the node is a character node (Block 975), the selected other identifying name is assigned to the node (Block 980), and the method 900 breaks out of the Loop 925-950 to restart at 925.

As can be appreciated from the foregoing, all nodes of the bipartite graph are initially un-named. Names are assigned to these nodes in the decreasing order of their sequence numbers. (Recall, e.g., 910-920 of FIG. 9.) Each time a node is named, edges of its dependent edge set are (e.g., provisionally) placed into the hash table. If hash collision occurs during the placement, the node is renamed and all of its dependent edges are re-placed into the hash table. (Recall, e.g., 940, 970, 975, 980 and 925 of FIG. 9.) This process is repeated until all edges in its dependent edge set are successfully placed into the hash table simultaneously. (Recall, 950-960 of FIG. 9.) Then the name of this node is considered to be settled.

Pseudo code for constructing a hash table in a manner consistent with the present invention is as follows:

---
Algorithm 2. Perfect Hash Table Construction
---
Input:
A sequence number N(v) for every node v
∈ U ∪ V;
A dependent edge set D(v) for every node v ∈ U ∪ V;
Name space $NS_{state}$ and $NS_{character}$ // contain available IDs for state nodes and character nodes, respectively.
Output:
A perfect hash table H;
A Character Translation Table CTT, indexed by the ASCII codes of characters;
Algorithm:
Set H, CTT, and STT empty;
Sort nodes in U ∪ V in decreasing order of their sequence numbers;
for every node u in the sorted set U ∪ V do
//Without loss of generality, suppose u is a state node (the following code should be changed accordingly if u is a character node);
{
Among all available IDs in $NS_{state}$, randomly choose an ID, say id1, which hasn't been tried by node u; if all IDs in $NS_{state}$ have already been tried by node u, an error is returned;
Name node u as id1 and place all edges of D(u) into hash table H; //for every edge < u, v > in D(u), it's guaranteed that v has already been named;
if no hash collision occurs during the placement of D(u)
remove id1 from $NS_{state}$;
else
goto (1);
}

---

Consider the dependent edge sets in FIG. 11. Character node m is the first to be assigned a name because it has the largest sequence number. Since node m has no dependent edge, any name for node m is acceptable. After that, state node 6 is named, and its dependent edge <6, m> is placed into the hash table. Note that the other endpoint of edge <6, m> (which is m) has already been named.

The next node to be named is s, which has one dependent edge <6, s>. Please also note that the other endpoint of edge <6, s> (which is 6) is already named. When a hash collision occurs during the placement of edge <6, s>, only node "s" is renamed, while the ID of node "6" will never be changed. This is because some other edges connected to node "6" (the dependent edge set of node "6") were already placed in the hash table and node 6 is "settled". If node "6" was renamed, all these edges would need to be re-placed again, which might cause further hash collisions. Renaming node 6 is clearly undesirable.

The foregoing process repeats until every node has been named. After this procedure, all edges are placed in the hash table without collision.

2D $P^2$-Hashing may fail when all names in the name space have been tried before a collision-free placement of a node's dependent edge set could be found. Two measures could be employed to avoid the failure: (1) increase the name spaces of state nodes and character nodes; and/or (2) reduce the load factor of the hash table. However, both measures would increase the memory cost of the perfect hash table.

The 2D $P^2$-Hashing algorithm has several characteristics, which are summarized as follows.

By breaking edges of the bipartite graph into small independent sets, the impact of hash collision during the placement of an edge is limited to a relatively small range. Consider the AC automaton of FIG. 6, which would be problematic for the $P^2$-Hashing process. With the 2D $P^2$-Hashing process, after the bipartite graph decomposition, transitions of the AC automaton (i.e., edges of the bipartite graph) will be divided to 26 independent single-transition sets. When constructing the perfect hash table, these 26 single-transition sets will be placed into the perfect hash table seperately. The failure of the placement of a transition set only affects one transition (resulting in a replacement of the single transition). As a result, the success probabilities of set placements are significantly increased.

With the 2D $P^2$-Hashing process, once the name of a node is "settled," it will never be changed again. (This is only for initial construction of the hash table. It can be changed later, during updates, as described in §4.4.2 below.) This avoids fluctuations of the hash table.

When an edge set is about to be placed into the hash table, every edge in the set has one settled end node and one unsettled end node (which is a common node shared by all edges in the set). When hash collisions occur during the set placement, only the common unsettled node needs to be renamed. Consider, for example the edge set dependent on node "0" in FIG. 11. It has two edges, which are <0, s>, and <0, m>, respectively. When this edge set is about to be placed in the hash table, the nodes "s" and "m" are already settled. If any collision occurs during the placement of the two edges, only their common unsettled node (i.e., "0") will be renamed.

Due to the principles used in the bipartite graph decomposition and perfect hash table construction of the 2D $P^2$-Hashing process, large edge sets are likely to be placed in the hash table at the very beginning when the hash table is almost empty, while the edge sets placed to the hash table at the end are very small. In this way, the 2D $P^2$-Hashing process can achieve higher success probabilities for large set placements.

§4.2.3 N-Dimensional Progressive Perfect Hashing

Figure 12:
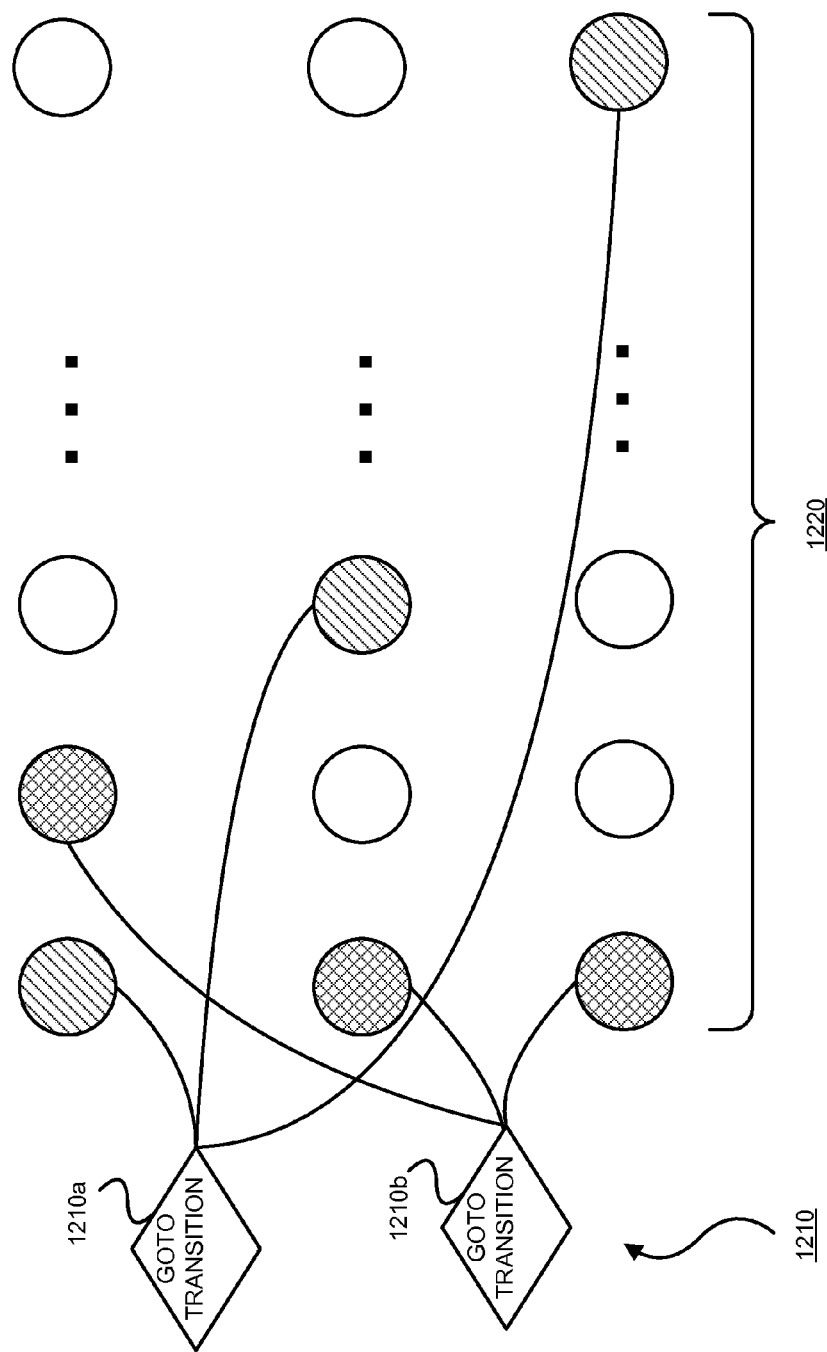
FIG. 12 is an n-partite graph model.

In addition, the proposed 2D $P^2$-Hashing algorithm can be easily extended to support more than two dimensions in the hash key, i.e., replace the bipartite graph model with a multipartite graph model. FIG. 12 is an n-partite graph model including various types of nodes 1220 linked by "GOTO" transitions 1210. In this simplified example, hatched nodes are linked by GOTO transition 1210a, while cross-hatched nodes are linked by GOTO transition 1210b.

§4.3 Multi-String Matching System Including a Generated Perfect Hash Table

Figure 13:
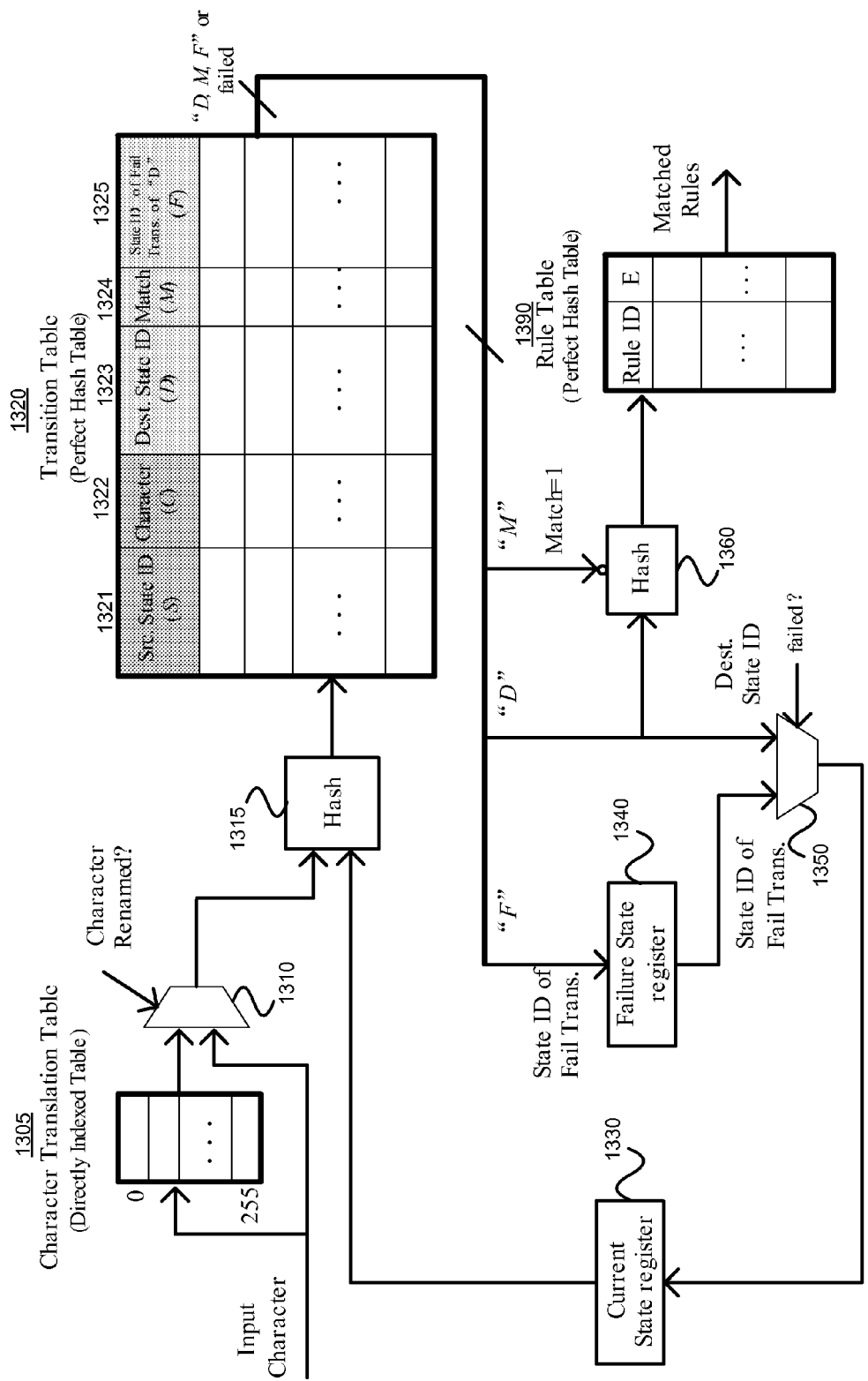
FIG. 13 is a block diagram of an exemplary apparatus that may perform various operations, and store various information generated and/or used by such operations, in a manner consistent with the present invention.

The architecture of exemplary multi-string matching engine 1300 is shown in FIG. 13. There are three main tables in the exemplary architecture, including two perfect hash tables and one directly indexed table. More specifically, character Translation Table ("CTT") 1305 is used to translate input characters from ASCII codes to the internal encodings. CTT 1305 is used only for the 2D $P^2$-Hashing process. To support both $P^2$-Hashing and 2D $P^2$-Hashing in a single architecture 1300, a selector 1310 is used to decide if the CTT 1305 is to be used or bypassed. Note that the number of entries in CTT 1305 is fixed, in this example at 256 (one for each ASCII char). Transition Table ("TT") 1320 is used to store goto transitions and failure transitions and is implemented as a perfect hash table. Each entry of TT 1320 represents one goto transition of the AC automaton and includes five fields. The first two fields, source state ID ("S") 1321 and character ("C") 1322, are used as the hash key to search the table. The third field "D" 1323 is the ID of the destination state pointed by the goto transition. The fourth field "M" 1324 is used to indicate if the state in column "D" 1323 matches any rules ("1" means match and "0" means no match). The last field "F" 1325 records the state ID pointed by the failure transition derived from the state in field "D" 1323.

The matching rules are stored in Rule Table ("RT") 1390. Every time a state associated with rules is visited, the state ID is used as the hash key to get the index of RT 1390. To use memory efficiently, each entry of RT only stores one rule. If a state is associated with multiple matching rules, all its associated rules are stored in continuous entries starting at the location pointed by the hash index, and one bit in each entry is used to indicate if the entry is the last rule associated with the state. For instance, state 5 in FIG. 1 is associated with two rules (rules 2 and 6). Therefore, rules 2 and 6 are stored in two continuous entries, and the ID of state 5 is used as the hash key to get the index of the first rule. One rule may have multiple instances in the rule table RT 1390 if it is associated with multiple states. The details about how to construct table RT 1390 will be described later.

There are several properties about the TT 1320 worth mentioning. First, although each state on the AC automaton may occur multiple times on the first column 1321 (due to multiple goto transitions derived from the state), it can only occur once on column "D" 1323 (because each state is pointed by one goto transition). Second, each state on the AC automaton has only one failure transition. Because of these two properties, the failure transition derived from each state (say d) can be stored at the same entry where the goto transition pointing to state d is stored.

Based on the exemplary architecture 1300 in FIG. 13, the processing of a received a character (say c) is explained below. First, character c is used to index table CTT 1305 to get the internal encoding of c. (This step is required only when 2D $P^2$-Hashing is used in the construction of the perfect hash tables.) Then, the concatenation of current state ID (stored in current state register) 1330 and the encoding of c is used as the hash key sent to the hash unit 1315, which returns the index to table TT 1320. The current state ID and character c are compared with the first two fields 1321 and 1322, respectively, of the indexed entry.

If the comparisons return a match, a goto transition is found and (1) the current state register 1330 is updated using field "D" 1323 of the indexed entry, (2) the failure state register 1340 is updated using field "F" 1325 of the indexed entry, and (3) table RT 1390 is searched (using field "D" as the hash key) to find matched rules if field "M" 1324 is equal to 1. If, on the other hand, the comparisons do not return a match, then a failure is returned and (1) the current state register 1330 is updated using the state ID stored in the failure state register 1325, and (2) the procedure is repeated.

As illustrated by the foregoing example, it is easy to see that the major operations involved in the architecture 1300 are hash calculations and table accesses. Therefore, the architecture 1300 is suitable for both hardware and software implementations.

§4.4 Refinements, Extensions and Alternatives
§4.4.1 Progressive Perfect Hash Table Construction with Rule Table Support In at least some exemplary embodiments consistent with the present invention, two perfect hash tables (TT 1320 and RT 1390) are constructed simultaneously. Hash keys used in the two hash tables are discussed first. Recall that the hash key of TT 1320 is the concatenation of source state ID (Recall 1321, 1330, 1315.) and input character (Recall 1310, 1315 and 1322.), while the hash key of RT 1390 is only the destination state ID.

To generalize the perfect hash table construction problem, suppose that each rule $R_i$ corresponds to a virtual character $y_i$. Values of these virtual characters are all NULL. With the introduction of virtual characters, hash keys of the two hash tables are unified to the same form (in this case the concatenation of source state ID and character). The exemplary 2D $P^2$-Hashing processes may be modified to support the constructions of the two perfect hash tables (TT and RT) as follows.

The exemplary 2D $P^2$-Hashing process converts the AC automaton M=(Q, Σ, g, f, T) to a bipartite graph B=(U, V, E). With the consideration of two tables, let U=Q, and V=Σ∪{$y_1$, ... $y_l$}, where l is the number of rules. Let the edge set E be the union of two subsets: $E_1$ and $E_2$. Each edge in $E_1$ corresponds to a goto transition, i.e., $E_1$={<q,c>|∀q∈Q, ∀c∈Σ, that g(q, c)≠fail}. Each edge in $E_2$ corresponds to a pair of state and matched rule, i.e., $E_2$={<q, $y_i$>| if state q matches rule i}.

Figure 14:
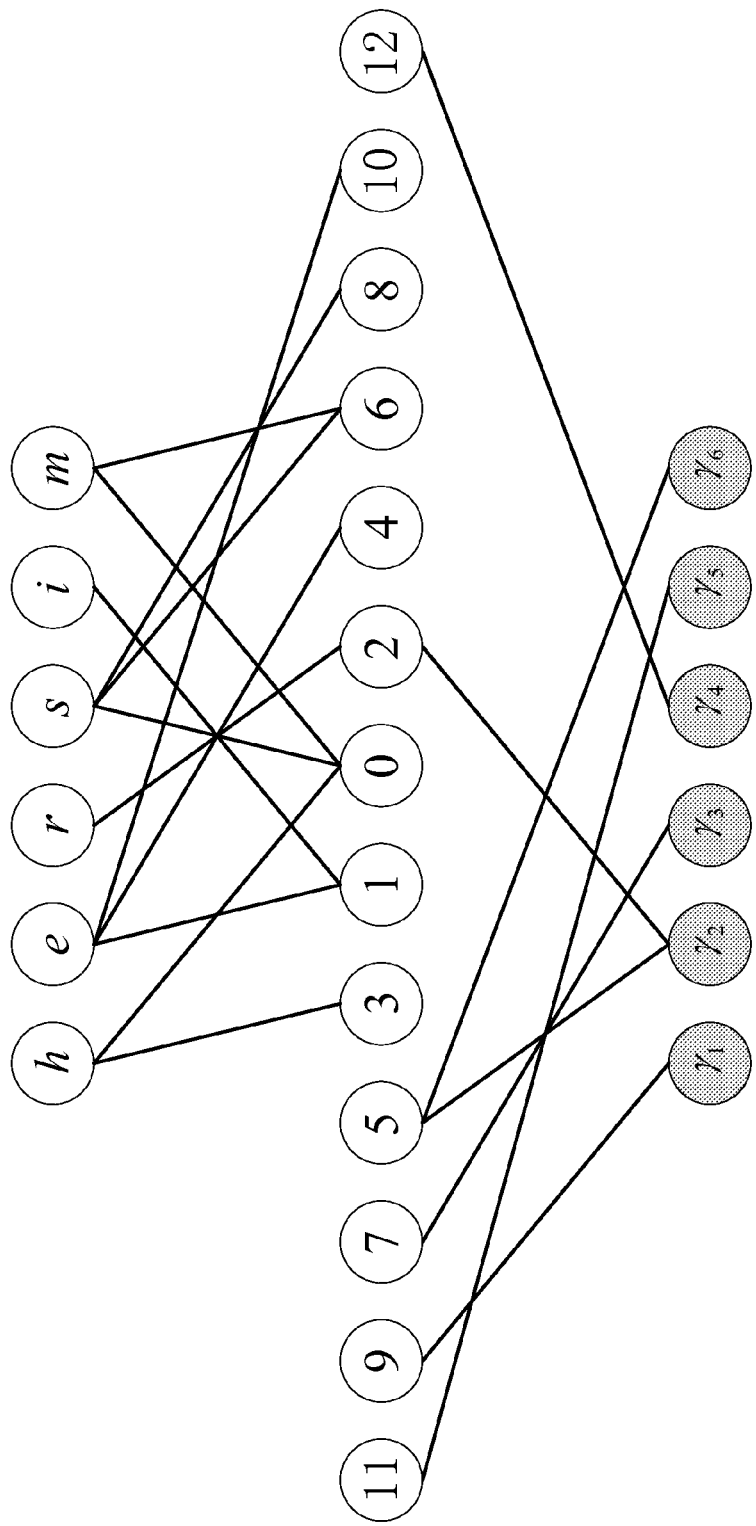
FIG. 14 is a bipartite graph model of the AC automaton of FIG. 1 in which matching rules are considered.

Consider the AC automaton in FIG. 1. Its bipartite graph model with the consideration of matching rules is shown in FIG. 14, where gray nodes correspond to virtual characters. Since $y_1$, ... $y_l$ are virtual characters, they cannot be renamed to help avoid hash collisions. The reason for representing them in the bipartite graph is to help determine the degrees of state nodes, which imply the relative difficulties of renaming the state nodes to achieve collision-free placements in both perfect hash tables. In the exemplary 2D $P^2$-Hashing process, the bipartite graph is decomposed to small edge sets. Since virtual characters cannot be renamed, they are treated as fixed nodes, and do not participate in the procedure of decomposition. One possible decomposition result of the bipartite graph of FIG. 14 is shown in the table of FIG. 15. Finally, the perfect hash tables are constructed as with the 2D $P^2$-Hashing process already described, except that each dependent edge set here might have two different types of edges. During the placement of each dependent edge set, edges are placed into the corresponding hash tables according to their types. Any hash collision that occurs during the placement of a dependent edge set causes the associated node to be renamed, and also causes all edges in the set to be re-placed in the hash table. Note that the definition of hash collision in the rule table RT 1390 is different from that in the transition table TT 1320. Consider, for example, state node 5 in FIG. 15. It is associated with two rules, R2 and R6. According to the exemplary system design, the ID of state node 5 is used as the hash key to get the hash index, and place the two rule instances are placed in two continuous entries starting at the index. The placement is successful if both of the two entries are available; otherwise a hash collision occurs.

§4.4.2 Perfect Hash Table Updates

Rule sets used in network appliances (such as routers, firewalls, network intrusion detection systems, etc.) typically require frequent updates. When a rule set changes (for example, when a new rule is added or an existing rule is to be deleted), its corresponding automaton representation should be changed accordingly. Therefore an automaton implementation of a rule set should support incremental updates to allow rules to be added and/or deleted. In this section, two techniques that can be used to support incremental updates on a perfect hash table (such as a perfect hash table generated with $P^2$-Hash and 2D $P^2$-Hash for example) are described in §§4.4.2.1 and 4.4.2.2.

In this section, all symbols and definitions will have the same meanings as used above unless specifically noted otherwise.

Since the insertion and deletion of a rule can be decomposed to multiple insertions and deletions of transitions, this process can be considered as how to delete a transition from the hash table, and how to insert a transition into the hash table. Deleting a transition from the hash table is trivial, and is similar to performing a hash table lookup. Inserting a transition into the hash table, however, is not so trivial, because hash collisions may occur during the insertion of a new transition. In the exemplary 2D $P^2$ hashing process described above, when hash collision occurs, the source state or the labeled character of the new transition is renamed to attempt to resolve the collision, and all related transitions are re-placed into the hash table in a way that avoids the collision.

Figure 16:
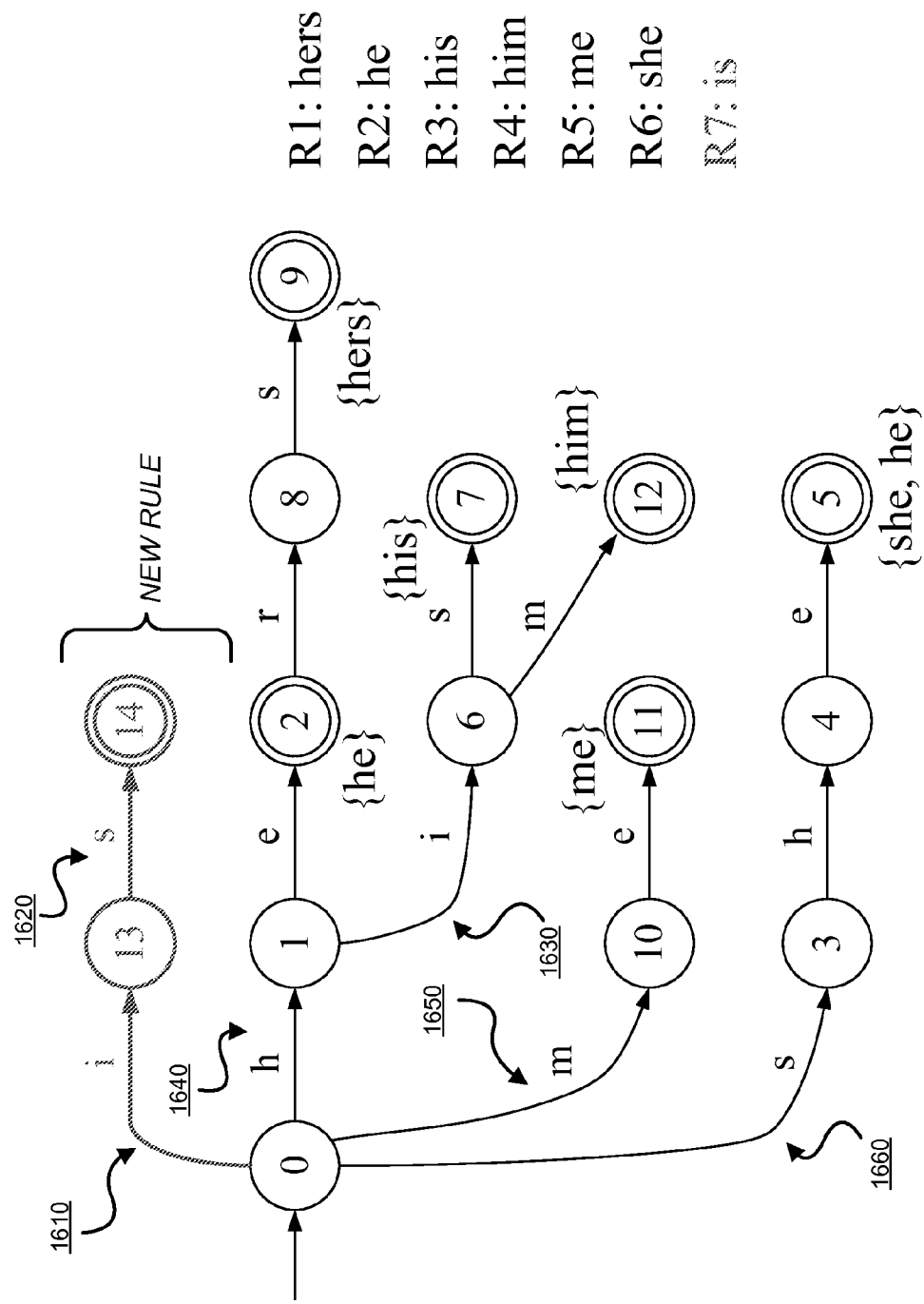
FIG. 16 is the AC automaton of FIG. 1 with a new rule inserted.

Referring to the example in FIG. 16, assume that it is desired to insert a new rule "is" (R7) into the rule set of FIG. 1. In this case, two transitions <0, i>→13 1610 and <13, s>→14 1620 need to be inserted into the hash table representation of the AC automaton. (For simplicity, FIG. 16 only shows the goto transitions, while failure transitions are not shown.) To insert the transition <0, i>→13 1610 into the hash table, a hash calculation is performed using <0, i> as the hash key. The location of the hash table indexed by the hash result will be used to store the new transition. If, however, this location is already occupied by an existing transition (e.g., of a previously placed rule), a hash collision occurs. If a hash collision occurs, either the state "0" or the character "i" will need to be renamed to find a different hash location for the new transition (assuming that the previously placed transition is to remain in the hash table and not "kicked out").

This renaming process might affect some existing transitions in the hash table. For instance, if character "i" is renamed, the existing transition <1, i>→6 1630 will be affected and will need to be rehashed and re-placed into the hash table. If, on the other hand, state "0" is renamed, there will be three transitions affected; <0, h>→1 1640, <0, m>→10 1650, and <0, s>→3 1660. In consideration of the foregoing, every time one of the two "dimensions" (state and character) is selected for renaming, rehashing and re-placing, the dimension (state or character) causing less impact on the existing transitions should be chosen.

In the foregoing example, the character "i" should be renamed (and rehashed and re-placed) instead of renaming (and rehashing and re-placing) state "0" since renaming the character "i" causes less impact on the existing transitions than renaming state "0". This example uses a very small rule set (six existing rules (R1-R6) plus one new rule (R7)). In existing network appliances, the rule sets are very large. For instance, the string matching rule set used in Snort (SNORT is a free lightweight network intrusion detection system for UNIX and Windows. Available online at http://www.snort.org.), a well-known open-source network intrusion detection system, includes thousands of rules, which correspond to an AC automaton with tens of thousands (or even more) of states and transitions. Since each character is usually associated with thousands of transitions, especially in large rule sets, renaming characters when a collision occurs when inserting a new transition is infeasible because too many existing transitions would be affected and it might not be possible (or practical) to find a collision-free placement for all these transitions in a heavily loaded (i.e., high load factor) hash table. So the better (and perhaps only feasible) choice is to rename the source state of the conflicting transition until all of its associated transitions (including the new transition) are placed into the hash table without collision.

Consider a state (e.g., state "α") with $Z^\alpha$ transitions. Among the $Z^\alpha$ transitions, one is the new transition and causes hash collision with an existing transition in the hash table. Suppose the hash table has $|S|$ ($|S|>>Z^\alpha$) entries and the load factor of the hash table is ρ. The probability of placing the entire set of transitions of state a into the hash table without collision after each state renaming is:

$$P(\text{success of placing all transitions of state } \alpha) \approx (1-\rho)^{Z^\alpha} \quad (2)$$

In other words, the state has to be renamed by $(1-\rho)^{-Z^\alpha}$ times on average before a conflict-free placement for the transitions associated with state a is found. Thus, if $Z^\alpha$ is too large, the time complexity of finding a conflict-free placement might become prohibitively high since ρ (0≤ρ<1) is usually quite large in an existing hash table (i.e., a hash table storing transitions of previously existing rules of the automaton).

Some real automatons include some states associated with a large number of transitions (e.g., about 100 transitions, or more). These states are referred to as "large states." The number of transitions associated with a state is referred to as the "size" of the state. These large states are usually populated on the first several levels (say, the first 3 or 4 levels) of the automaton. For example, the biggest state of the AC automaton corresponding to the Snort rule set is the root state, which has almost 200 transitions. The biggest state of the AC automaton corresponding to the ClamAV rule set (available online at http://www.clamay.net) is also the root state, which has 255 transitions.

Unfortunately, if a new transition is added to one of these big states and causes hash collision, the time complexity of finding a conflict-free placement for all transitions of the corresponding big state will be very high. (Recall that the $P^2$ hashing and 2D $P^2$ hashing processes seek to place the state or character nodes with the largest number of transitions first, so renaming a large state in an already densely populated (high load factor) hash table is very difficult.)

Two techniques for performing incremental updates on a sparse automaton with low computational complexity are described in §§4.4.2.1 and 4.4.2.2 below. These two techniques may be used separately, or in combination.

§4.4.2.1 First Update Process: Space Reservation for Big States

Figure 2:
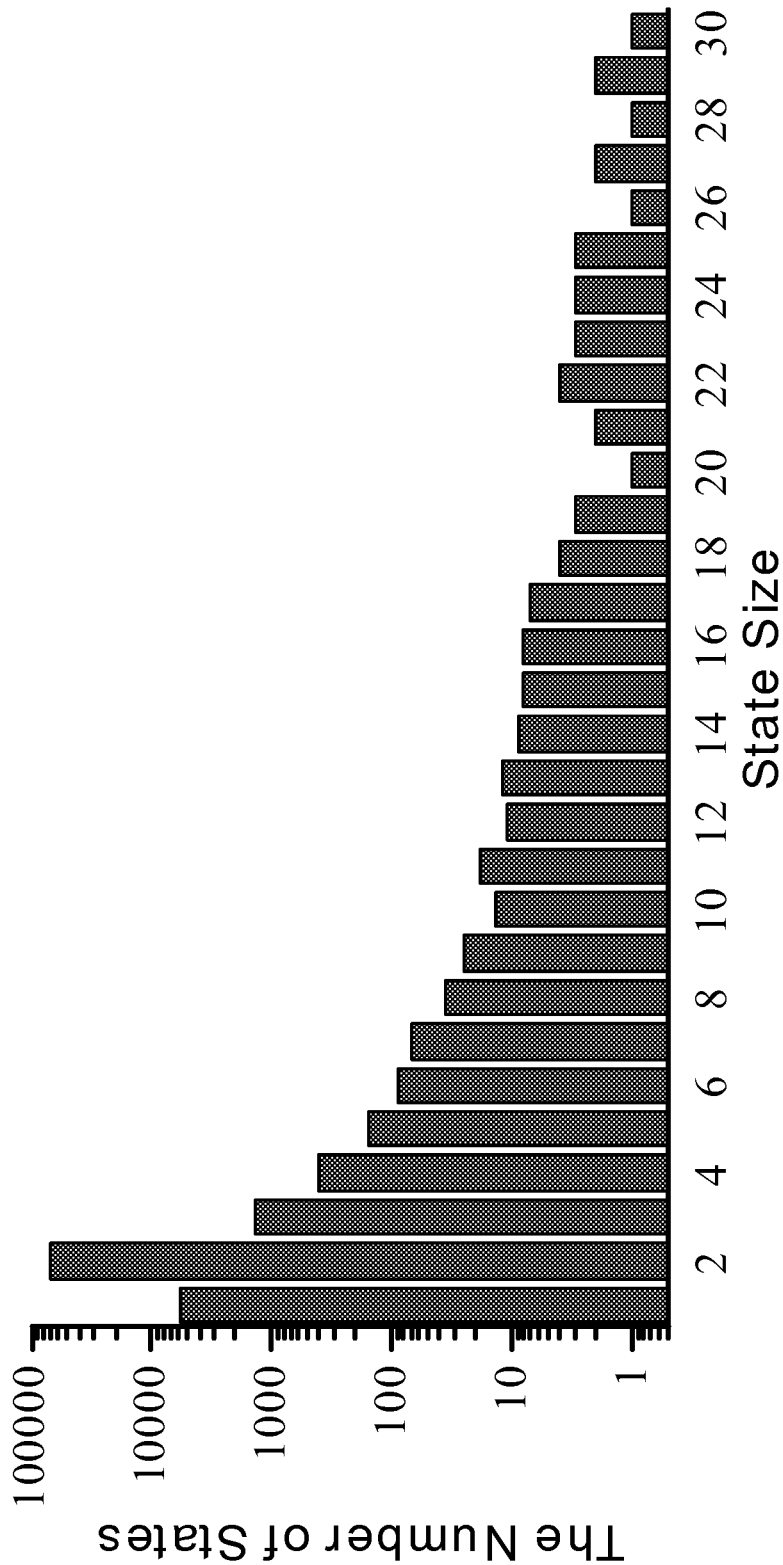
FIG. 2 illustrates the state size distribution of AC automaton based on the Snort rule set (only shows states with size<=30).

The first update technique, referred to as "space reservation for big states," is based on the following observation. Recall that FIG. 2 shows the state size (in terms of transitions) distribution of the AC automaton corresponding to the Snort rule set. In the statistics illustrated in FIG. 2, both goto transitions and failure transitions are considered when the size of a state is calculated. (If the failure transitions are excluded from the statistics, the coordinate value on the X-axis should be the current value minus one because each state has exactly one failure transition.) FIG. 2 illustrates that most of the states have very small sizes (i.e., a very small number of transitions). In fact, 90% of the states have only one goto transition. There are only a few states larger than 25. More specifically, according to the statistics, there are only 0.016% states which are larger than 25, and the goto transitions of these big states take only a 0.75% share of the entire set of goto transitions. A similar distribution has been observed in the AC automaton of ClamAV rule set. (If the automaton is viewed as a tree structure with the root state on level 1, these big states occur on the first several levels of the automaton.)

Based on the foregoing observations, space in the hash table can be reserved for the future transitions of the states which are larger than a certain threshold (t) (e.g., t=25 transitions) when initially building the hash table. As a result, adding new transitions to large states that are larger than the threshold t can be avoided when performing incremental updates. (Assume that the distribution of state sizes of the automaton won't change too much after a series of updates.) Consequently, the huge computational complexity of renaming the big states in the event of hash collisions is avoided.

Based on our statistic on Snort and ClamAV rule sets, only 5% of hash table space needs to be reserved for the future transition of big states if the threshold is set to 25. Naturally, other thresholds can be chosen. A percentage of the hash table space to be reserved can then be selected based on statistics on actual or expected state sizes of the rule set to be represented.

Updates involving inserting states with less transitions into the hash table is easier (and feasible) since the likelihood of a collision (or multiple collisions) is less. Thus, the likelihood of needing to rename, rehash, and re-place smaller states one or more times is not too high.

§4.4.2.2 Second Update Process: Selective State Kick-Out
§4.4.2.2.1 Kick-Out Operation Normally, the state size distribution of an automaton won't change too much after a series of incremental updates since the incremental updates only add and/or remove a few rules each time. If the space reservation for big states technique, described in §4.4.2.1 above, is applied to the hash table construction, the insertion of a new transition will only affect the states which are relatively small (i.e., those smaller than the selected threshold t). Unfortunately, however, if a new transition is added to a state with even a moderate size (but below the selected threshold), the success probability of renaming the state to avoid the hash collision with existing transitions might still be low. For example, if the state to be renamed has 20 transitions (which is less than the exemplary big state threshold of 25), and the hash table load factor $\rho$ is 0.8, the success probability is only $1 \times 10^{-14}$. Such a success probability is too low for the incremental updates on the hash table to be performed in an acceptable manner (because of the huge computational complexity).

This section describes a second technique, referred to as "selective state kick out," that can be used to avoid this problem. (Note that the second technique described in this section may be used in combination with the space reservation for big states technique, described in §4.4.2.1 above.) In the second technique, instead of repeatedly renaming the moderate-sized state until all of its associated transitions are placed into collision-free locations of the hash table, its new transition is permitted to "kick out" the transition currently residing in the conflicted location of the hash table, provided that the state associated with this resident transition is smaller than the current state.

In some instances, the state that is "kicked out" might still be too large to be placed in an acceptable manner (because of a still huge computational complexity). In such instances, a kicked out state that is still relatively large can itself kick out smaller states, until the states to be renamed are small enough. (Therefore, the kicking out process may be recursive.) Then, these small states will only need to be renamed to achieve collision-free placements.

The foregoing technique decomposes a complicated problem (due to the low probability of placing a moderate-sized state) into many simpler problems (higher probability of placing multiple smaller-sized states). An analysis on the AC automatons of the Snort and ClamAV rule sets showed that more than 97% and 99%, respectively, of transitions are associated with states with size smaller than or equal to five. Therefore, it is easy to find small states and kick out them from the hash table to make room for the larger (e.g., moderately-sized) states.

To use this second technique, it is necessary to determine when (i.e., under what condition(s)) should conflicting, existing transitions be "kicked out" of the hash table. The following describes one way to make this determination.

Suppose a state (referred to as state a) kicks out j smaller states (referred to as states $b1, \ldots, bj$). If, on one hand, the size differences between the state a and the states $b1, \ldots, bj$ are not big enough (for example, a 20-transition state kicks out three 17-transition states and one 15-transition state), it is possible that the placements of the transitions of the multiple smaller states $b1, \ldots, bj$ will be even more difficult than the placement of the transitions of single larger state a. If this is the case, then the kicking-out operation (i.e., state a kicking out states $b1, \ldots, bj$) should not be performed. Instead, state a should be renamed (e.g., again) to determine if state a can be placed without collision, or if it is possible to find smaller states to kick out in the event of a collision. In other words, in the event of a collision, a state to be placed should not necessarily kick out conflicting state(s), even if those conflicting states are smaller. Rather, the state to be placed should only kick out conflicting state(s) if a good enough opportunity arises (e.g., if it should be easier to place the conflicting state(s) than the state to be placed). That is, it is desirable to ensure that every kicking-out operation makes the placement problem(s) simpler and closer to a solution.

In the following exemplary embodiments, a 256-entry Kicking-out Threshold Table ("KTT") is used to control kicking-out operations; that is to control when to perform a kicking out operation and when to rename the state to be placed. The x-th entry of the KTT table (denoted by KTT[x] ($1 \le x \le 256$)) indicates the size of the maximal state that can be kicked out by a state with size x. That is, in this exemplary embodiment, a state with size x is not allowed to kick out a state larger than KTT[x]. Instead, the state with size x can only kick out states whose sizes are all smaller than or equal to KTT[x].

Naturally, the (e.g., predetermined) value of KTT[x] will affect the performance of kicking-out operation. More specifically, if KTT[x] is set too small, the current state will likely require more renamings (with the associated computational complexity entailed) before it can find qualified small states to kick out. If, on the other hand, KTT[x] is set too big, it is easy for the current state to find qualified states to kick out. However, one or more of the states that are kicked out might be large enough to themselves and cause problems when they are to be placed back into the hash table. An exemplary process to compute an optimal value (neither too big, nor too small) of KTT[x] is described in §4.4.2.2.2 below.

Next, a procedure for inserting a new transition into the perfect hash table, assuming that a populated KTT table is already provided, is described with reference to FIGS. 17 and 18. Note that the method 1700 of FIG. 17 may invoke a recursive process (referred to as "Replace (a)"), described with reference to FIG. 18, to place all transitions of state a into the hash table.

Figure 17:
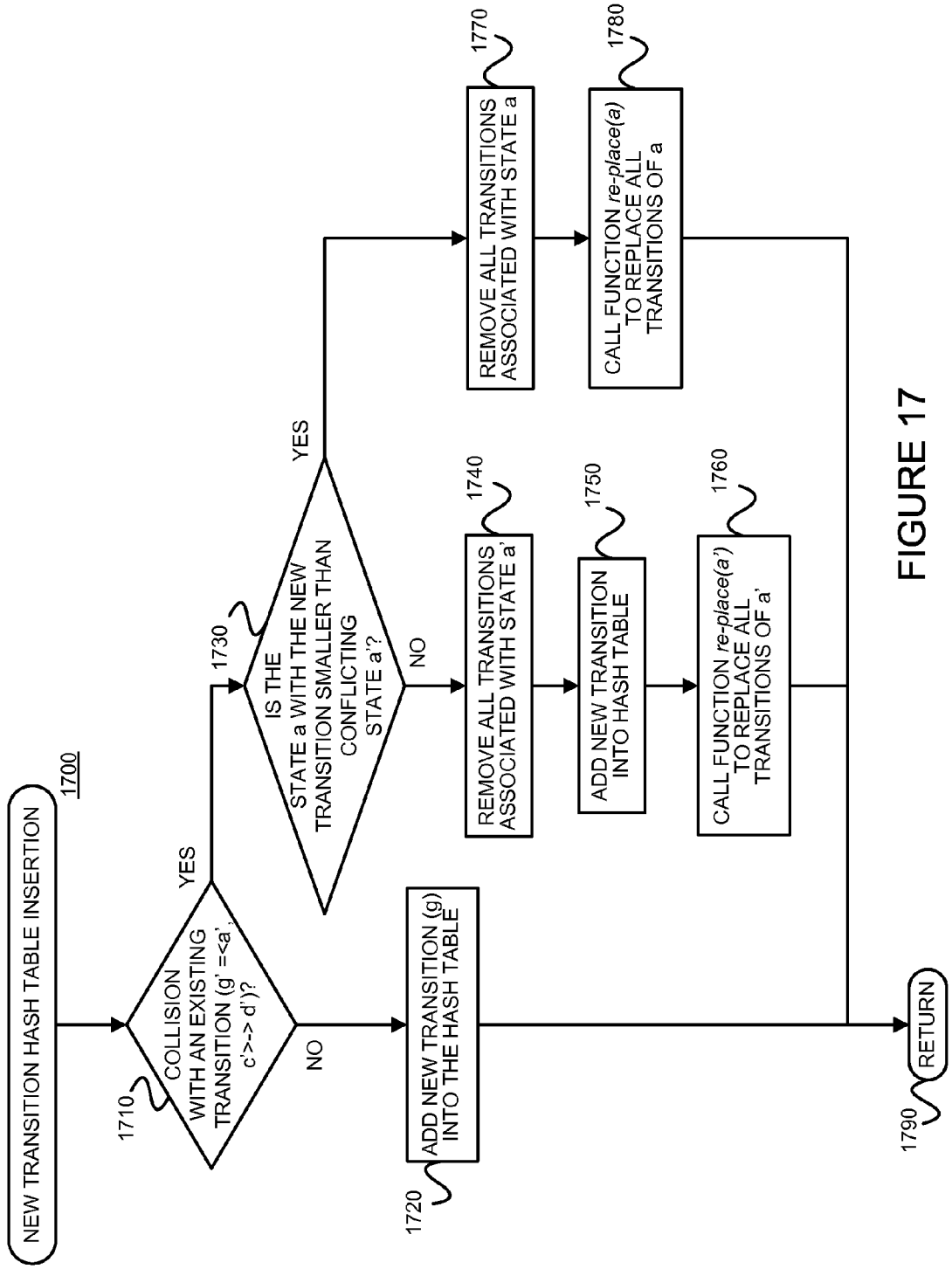
FIG. 17 is a flow diagram of an exemplary method for inserting a new transition into a perfect hash table.

FIG. 17 is a flow diagram of an exemplary method 1700 for inserting a new transition (g: <a,c>→d) into a hash table, in a manner consistent with the present invention. If an attempted insertion of the transition (g) does not cause any collision, the transition is simply added to the hash table at the hash location (Decision 1710 and Block 1720) before the method 1700 is left (Node 1790). If, on the other hand, the transition (g) causes a collision (e.g., with a transition of state a'), then the method 1700 continues to 1730 where it is determined whether the state (a) associated with the new transition is smaller than (i.e., has less transitions than) the previously stored state (a'). If, on the one hand, the size of the state (a) associated with the new transition is smaller than the size of the previously stored state (a'), then any transitions associated with the smaller new state (a) are removed from the hash table (Block 1770) and a function "re-place (a)" is called to re-place all transitions of the new state (a) (Block 1780) before the method 1700 is left (Node 1790). If, on the other hand, the size of the new state (a) is not smaller than the size of the previously stored state (a'), then any transitions associated with the previously stored state (a') are removed (i.e., kicked out) from the hash table (Block 1740), the new transition is added to the hash table 1750, and the function "re-place (a')" is called to re-place all transitions of the previously stored state (a') (Block 1760) before the method 1700 is left (Node 1790).

Pseudo code for inserting a new transition into the hash table consistent with FIG. 17 is as follows:

---

Process 1. Insert a new transition into the perfect hash table

---

Input:
A hash table H = {K, h, S}, where K is the set
of transitions currently stored in the hash table;
S is the set of locations in the hash table and
|S| ≥ |K|; h: K → N is the hash function;
A new transition g =< a, c >→ d that is to be
inserted into hash table H;
A State Translation Table STT, used to track
the name (i.e., encoding) of each state;
A Character Translation Table CTT, used to
track the name (i.e., encoding) of each
character;
A Kicking-out Threshold Table KTT, used to
guide the kicking-out process;
Output:
An updated hash table H' = {K', h, S}, where
K' = K ∪ {g}
An updated State Translation Table
STT'
An updated Character Translation Table CTT'
Process:
hash the new transition g =< a, c >→ d into
hash table location h(STT[a], CTT[c]); //the
concatenation of a and c is used as the hash
key;

---

Process 1. Insert a new transition into the perfect hash table

--- if the location is free, then
insert g into the hash table,
else
{
suppose the transition currently at the conflicted
hash location is g' =< a', c' >→ d';
if size(a) ≥ size(a'), then
//find the easier one to start with
{
remove all transitions associated with a from
the hash table
call recursive function replace(a)
}else {
remove all transitions associated with a' from
the hash table;
place < a, c >→ d in the hashed location;
call recursive function replace(a');
}
}
return( );

---

Figure 18:
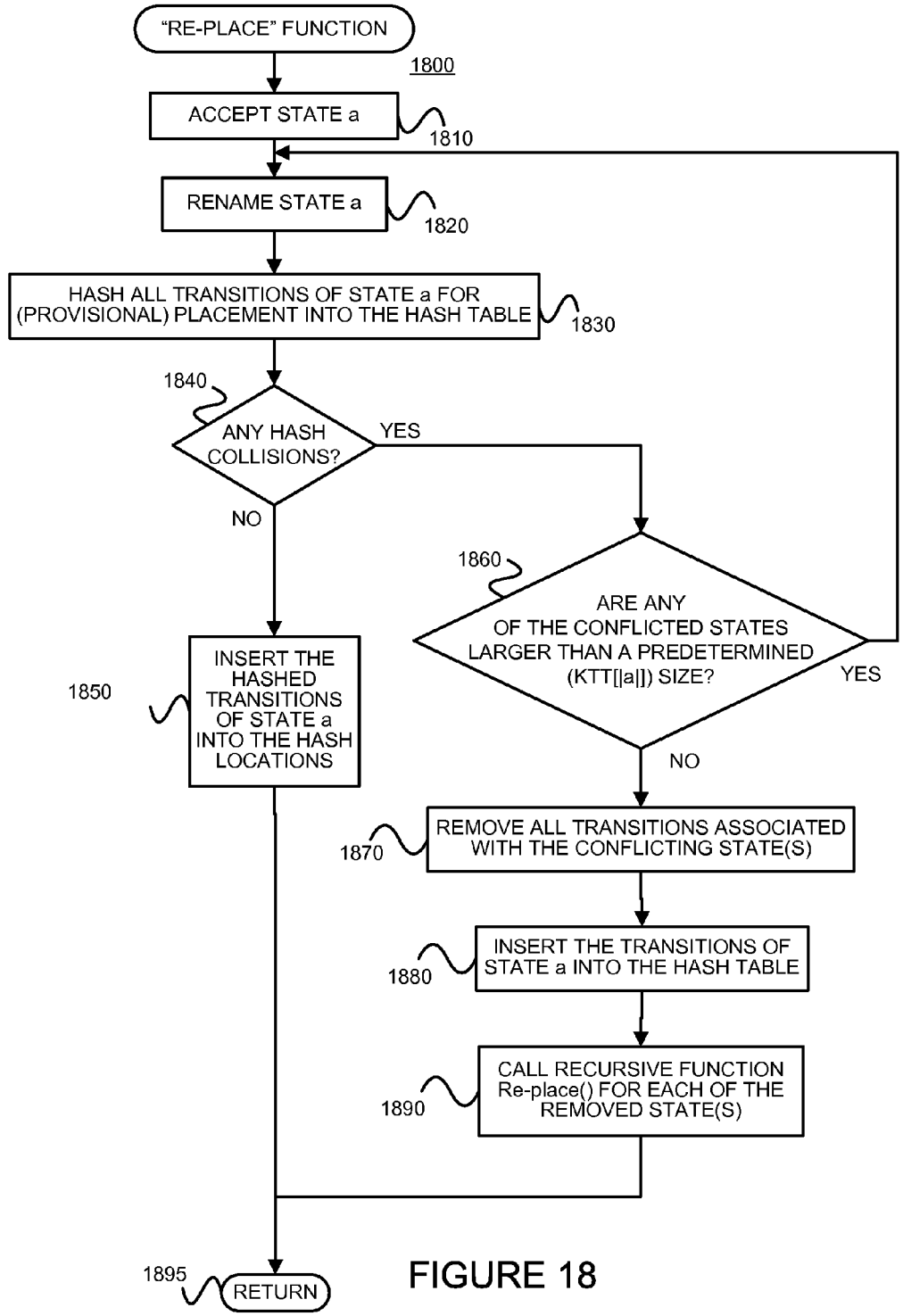
FIG. 18 is a flow diagram of an exemplary re-place method which may be used in the method of FIG. 17.

Referring back to blocks 1760 and 1780, FIG. 18 is a flow diagram of an exemplary method 1800 for performing a "re-place" process in a manner consistent with the present invention. A state (which may be a or a' of FIG. 17, though a is used for simplicity) to be re-placed is accepted and renamed. (Blocks 1810 and 1820) The transitions of the state are hashed for placement (at least provisionally) into the hash table. (Block 1830) It is determined if there were any hash collisions with any existing transitions that were previously placed in the hash table being updated. (Decision 1840) If not, the hashed transitions of the state are placed into the hash locations of the hash table (NO branch of Decision 1840 and Block 1850), before the method 1800 is left (Node 1895). If, on the other hand, it is determined that there were one or more hash collisions, it is determined whether any of the conflicting states (i.e., states with conflicting transitions) in the hash table are larger than a predetermined (e.g., KTT[|a|]) size. (YES branch of Decision 1840 and Decision 1860) If, on the one hand, it is determined that any of the conflicting state in the hash table is larger than the predetermined (e.g., KTT[|a|]) size, then the method 1800 branches back to block 1820. (That is the conflicting states are not "kicked out," but rather, the state is renamed to try placement again.) (YES branch of Decision 1860) If, on the other hand, it is determined that no conflicting state in the hash table is larger than the predetermined (e.g., KTT[|a|]) size (NO branch of Decision 1860), then the method 1800 removes ("kicks out") all transitions associated with any conflicting state(s) (Block 1870), inserts the transitions of the state (a) into the hash table (Block 1880), and the function "re-place( )" is called, recursively, for each of the removed ("kicked out") state(s) (Block 1890).

Pseudo code for implementing a "re-place( )" process consistent with FIG. 18 is as follows:

---

Function: Re-place (a)

---

Variable
A: a set of states that to be kicked out from the hash table
begin
rename state a;
A := empty; //reset the set to empty
let G be the set of transitions rooted from state a;
for each transition g = < a, c >→ d ∈ G do
{
hash g into a hash location
if the location is occupied by another transition g' =< a', c' >→ d', then -continued Function: Re-place (a)

```
{
if size(a') ≤ KTT[size(a)], then
        //check the KTT threshold to see if we can kick out the state
{
temporarily mark the hash location for g;
insert a' into A;
//kick out a'
} else
//the state is too big to kick out
{
clear all marks on the hash table;
quit the loop; goto (1);
//start over again
}
} else
temporarily mark the hash location for g;
}
//now we have found all states to kick out;
remove all transitions associated with the states in A;
place transitions of state a in the marked locations;
for each state a' ∈ A do
call recursive function replace(a');
return( );
end
```

Recall from decision 1860 of FIG. 18 that the exemplary method 1800 compares the size (referred to as "|x|" in the following) of any conflicting states with a predetermined (e.g., KTT[|x|]) size. Further recall that the (e.g., predetermined) value of KTT[|x|] will affect the performance of kicking-out operation. More specifically, if KTT[|x|] is set too small, the current state will likely require more renamings (with the associated computational complexity entailed) before it can find qualified small states to kick out. (Recall, e.g., the YES branch of Decision 1860 of FIG. 18.) If, on the other hand, KTT[|x|] is set too big, it is easy for the current state to find qualified states to kick out. (Recall, e.g., the NO branch of Decision 1860 of FIG. 18.) However, one or more of the states that are kicked out might be large enough to themselves cause problems when they are to be placed back into the hash table. An exemplary process to compute the best value (neither too big, nor too small) of KTT[|x|] is now described in §4.4.2.2.2 below.

§4.4.2.2.2 Configuring KTT Table

One important step in the replace( ) process described above is comparing the size of the resident state with the threshold defined in the KTT table. (Recall, e.g., 1860 of FIG. 18.) The reason to perform this check is to ensure that the next iteration of the recursive function will be easier, on average, than the current iteration, such that the program can converge and find a conflict-free placement for all transitions.

For a state with size x to be re-placed, it is desired to find the best KTT[|x|]; that is, the one that will minimize, on average, the expected "computational complexity." There are different metrics that can be used to define the complexity. In the following, two metrics—(1) the number of state renamings, and (2) the number of memory accesses—are considered. Using these two metrics to configure the KTT table is described in §§4.4.2.2.2.1 and 4.4.2.2.2.2 below.

The best configuration (set values) of the KTT table is related to the distribution of transitions in the hash table.

Define P(i) (0≤i≤256) as the probability that the size of the state associated with a randomly selected transition in the hash table is less than or equal to i. In particular, P(0)=1−ρ and P(256)=1. Note that P(i)−P(i−1) is the probably that the size of the state associated with a randomly selected transition in the hash table is exactly equal to i.

Given an (e.g., AC) automaton and is corresponding perfect hash table, P(i) (0≤i≤256) can be easily obtained by counting the number of transitions in the hash table associated with states of a certain size. So P(i) can be pre-computed when the hash table is constructed. Normally, P(1) is more than 90% because most of transitions in the hash table are associated with state size of 1.

§§4.4.2.2.2.1 Configuring the KTT Table to Minimize the Expected Number of State Renamings Define C(x, i) (0≤i≤x−1) as the expected total number of state renamings to place a state with size x when KTT[|x|] is set to i. This number includes all the state renamings caused by both (1) the placement of the current state and (2) the placement of any states that are kicked out.

Define C(x) as the expected number of state renames required to insert a state with size x with the best KTT[|x|] setting. Therefore:

$$C(x) = \min_{0 \le i \le x-1} C(x,i) \qquad (2)$$

The value of C(x) (0≤x≤256) can then be obtained using mathematical induction as follows:

$$C(0) = 0$$

$$C(1) = \frac{1}{p(0)}$$

$$\dots$$

$$C(x, i) = \frac{1}{p^x(i)} + \sum_{k=1}^{i} \frac{p(k) - p(k-1)}{p(i)} \cdot C(k) \cdot x$$

Given a hash table and its associated (e.g., AC) automaton, all C(x) (0≤x≤256) can be pre-computed and the best i that makes equation (2) hold can be stored in the KTT table entry KTT[|x|]. When performing the function Re-place( ), KTT[|x|] will be used to determine whether or not the resident conflicting states should be kicked out.

§§4.4.2.2.2.2 Configuring he KTT Table to Minimize the Expected Number of Memory Accesses Every time a state is renamed, multiple memory accesses might be needed to determine whether or not the transitions of the state can be stored in the hash table (as can be seen from the process Re-place( )). Therefore, the number of memory accesses is a more accurate performance metric for determining the computational complexity of the process Re-place( ) than the number of state renamings.

The following describes one way to get the value of KTT[|x|] that minimizes the number of memory accesses when performing the process Re-place( ). The analysis is similar to the discussed in §4.4.2.2.2.1 above, except for some small modifications to the equations.

Define q(i)=1p(i).

Define A (x, i) (0≤i≤x−1) as the expected total number of memory accesses required to place a state with size x when KTT[|x|] is set to i. This number includes all the memory accesses caused by the placement of the current state as well as the placement of the states that are kicked out.

Define A(x) as the expected number of memory accesses required to insert a state with size |x| with the best KTT[|x|] setting. Therefore:

$$A(x) = \min_{0 \le i \le x-1} A(x,i) \qquad (3)$$

The value of A(x) (0≤x≤256) can then be obtained using mathematical induction as follows:

$$A(0) = 0$$

$$A(1) = \frac{1}{p(0)}$$

...

$$A(x, i) = \left(\frac{1}{p^x(i)} - 1\right) \cdot \left(\sum_{k=1}^{x-1} (k \cdot p^{k-1}(i) \cdot q(i)) + x \cdot p^k(i)\right) +$$

$$x + \sum_{k=1}^{i} \frac{p(k) - p(k-1)}{p(i)} \cdot A(k) \cdot x$$

Given a hash table and its associated (e.g., AC) automaton, all A(x) (0≤x≤256) can be pre-computed, and the best i that makes equation (3) hold can be stored in the KTT table entry KTT[|x|].

Figure 19:
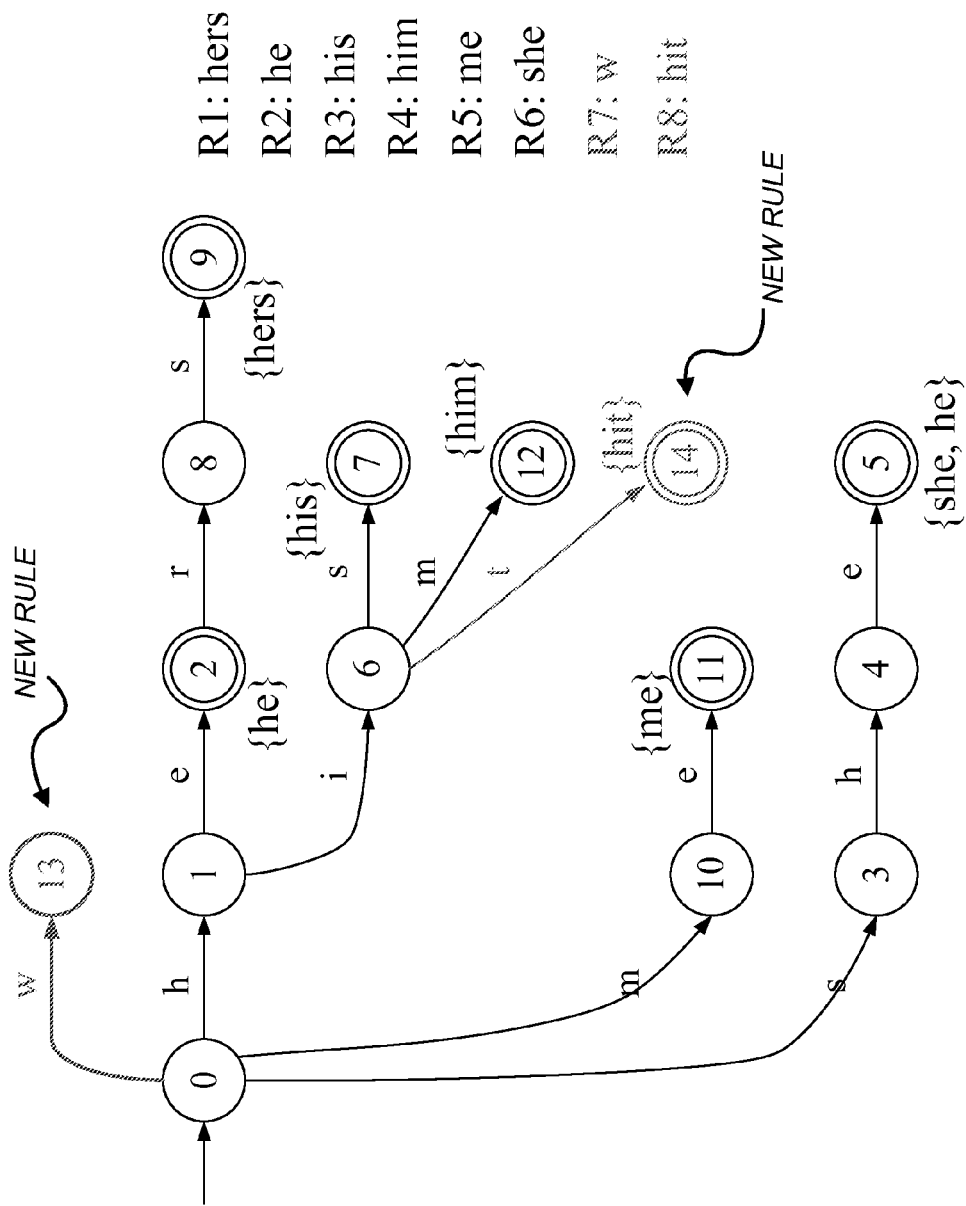
FIG. 19 is the AC automaton of FIG. 1 with new rules inserted.

§4.4.2.3 Illustrative Example of Updating the Hash Table Representation of an Automaton An example of updating a hash table representation of the AC automaton of FIG. 1, which uses the techniques of both §§4.4.2.2.1 and 4.2.2.2.2, is now described with reference to FIGS. 19-20b. Referring to FIG. 19, suppose new rules 7 (R7: w) and 8 (R8: hit) are to be added to the AC automaton. FIG. 20a depicts a hash table associated with the AC automaton. (For simplicity, the transitions in the hash table only show the source state and character. The destination state of each of the transitions is ignored.)

Assume that the root state 0 is a big state. Therefore, space in the hash table is reserved for future transitions of the root state 0 based on the technique of "space reservation for big states" described above in §4.4.2.2.1. For simplicity, in FIG. 20a, only one reserved entry is shown; namely the future transition <0, w> 2010.

P(i) (0≤i≤256) can be pre-computed based on the distribution of FIG. 20a. In particular:

$$P(0) = \frac{7}{20} = 0.35;$$

(since there are 7 empty slots in the hash table)

$$P(1) = \frac{12}{20} = 0.6;$$

(since there are 7 empty slots+5 transitions associated single-transition states in the hash table)

$$P(2) = \frac{16}{20} = 0.8;$$

(since there are 7 empty slots+5 transitions associated single-transition states+4 transitions associated with two-transition states in the hash table)

$$P(3) = \frac{16}{20} = 0.8;$$

(since there are no transitions associated with three-transition states)

$$P(4) = \frac{20}{20} = 1;$$

P(i)(i≥4)=1. (since there are 4 transitions associated with four-transition states (state 0)

The KTT table can also be pre-computed as described in §4.4.2.2.2 above.

Suppose a new rule "w" (R7) is to be added into the rule set as shown in FIG. 19. In this case, a new transition, <0, w>→13, is to be added into the hash table. Since this new transition is rooted from the "big" state "0", there is already a corresponding entry 2010 in the hash table of FIG. 20a reserved for this new transition.

Suppose further that a second new rule "hit" (R8) is to be added into the rule set, as shown in FIG. 19. In this case, a new transition, <6, t>→14, is to be added into the hash table. Assume further that when the transition <6, t> is hashed into location 2 of the hash table. Unfortunately, the hashed location of transition <6, t> "collides" with the existing transition <1, e> as shown by 2020 in FIG. 20a. Recall, for example, from decision block 1730 of the method 1700 of FIG. 17, since the size of state "6" (3 transitions, including that of the new rule, from state "6") is larger than the size of state "1" (2 transitions from state "1"), all transitions associated with state "1" (<1, e> at location 2 2020 and <1, i> at location 7 2030) will be "kicked out" from the hash table (indicated by arrows in FIG. 20a (Recall, e.g., 1740 of FIG. 17.), and the new transition, <6, t>, is placed into location 2 (Recall, e.g., 1750 of FIG. 17.). The resulting hash table having the new entry at location 2 and an empty entry at location 7 is shown in FIG. 20b. Notice that transitions <6,s> and <6,m> won't need to be rehashed and re-placed since node 6 hasn't been renamed.

Having placed the new transition of state 6, the two transitions <1, e> and <1, i> associated with state "1" that were "kicked out" will need to be re-placed into the hash table. Therefore, state "1" is renamed, and its two transitions are rehashed for (e.g., provisional) placement into new locations of the hash table. (Recall, e.g., 1740 and 1760; if these were kicked out after the first iteration, recall, e.g., 1870, 1890, 1820 and 1830 of FIG. 18.) If either of these two transitions of renamed state "1" collide with any existing transitions stored in the hash table (Recall, e.g., 1840 of FIG. 18.), it is decided whether or not such existing transitions can be kicked out based on the value stored at KTT [2] (index of 2 is used because state "1" has 2 transitions). (Recall, e.g., 1860 of FIG. 18.) Suppose, for example, that KTT[2] is equal to 0. In this case, then no states can be kicked out. Thus, state "1" will have to be renamed until both of its transitions are placed into hash table without collision. (Recall, e.g., 1860, 1820, 1830 and 1840 of FIG. 18.) The success probability is $(1-0.6)^2 = 0.16$, where 0.6 is the load factor of the hash table in FIG. 20b. Alternatively, suppose that KTT [2] is equal to 1. In this case, the two transitions of state "1" are allowed to "kick out" transitions associated with single-transition states. It will be easier to re-place any such "kicked out" transitions associated with single-transition states into the hash table without collision.

The above example is relatively simple because the initial state that was "kicked out" (i.e., state "1") has a size of only 2 (i.e., it has only two transitions to be re-placed). If the initial state that was "kicked out" is bigger, then the above process may need more iterations (by calling the recursive process Re placed (Recall, e.g., 1890 of FIG. 18.) to re-place all transitions into the hash table without collision.

§4.4.3 Use in Deterministic Finite Automatons

Besides the sparse (e.g., AC) automaton, the proposed perfect hashing processes could also be used for DFA (e.g., AC-DFA). Considering the huge memory cost of AC-DFA, the scheme proposed in the reference T. Song, W. Zhang, D. Wang, and Y. Xue, "A Memory Efficient Multiple Pattern Matching Architecture for Network Security," *IEEE INFOCOM* (2008)(incorporated herein by reference) may be used to eliminate the backward transitions to states at the first several levels, and store only the remaining transitions in the perfect hash table. Actually, AC-DFA could be viewed as a special case of AC automaton (i.e., an AC automaton without failure transition). Therefore, the perfect hash table construction processes were presented based on the general case of a sparse automaton.

§4.5 Further Exemplary Apparatus

Figure 21:
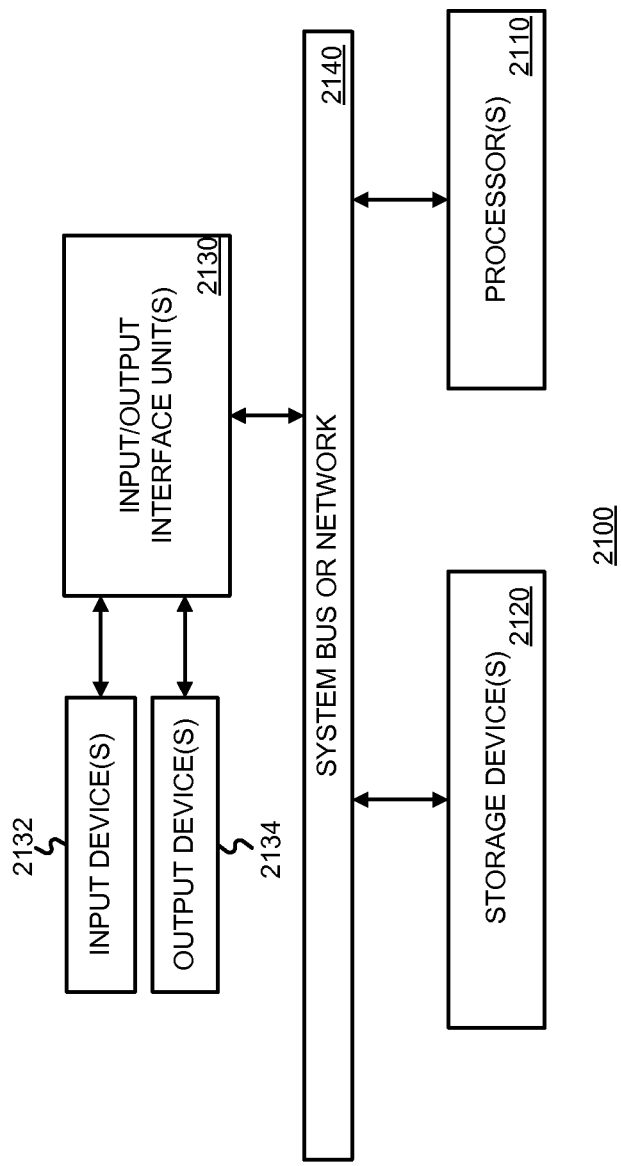
FIG. 21 is a block diagram of a machine that may perform one or more of the processes described herein, and/or store information used and/or generated by such processes.

FIG. 21 is a block diagram of a machine 2100 that may perform one or more of the processes described above, and/or store information used and/or generated by such processes. The machine 2100 may be used with the apparatus 1300 of FIG. 13. The machine 2100 includes one or more processors 2110, one or more input/output interface units 2130, one or more storage devices 2120, and one or more system buses and/or networks 2140 for facilitating the communication of information among the coupled elements. One or more input devices 2132 and one or more output devices 2134 may be coupled with the one or more input/output interfaces 2130. The one or more processors 2110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 2120 and/or may be received from an external source via one or more input interface units 2130.

In one embodiment, the machine 2100 may be one or more conventional personal computers, servers, or routers. In this case, the processing units 2110 may be one or more microprocessors. The bus 2140 may include a system bus. The storage devices 2120 may include system memory, such as read only memory (ROM) and/or random access memory (RAM). The storage devices 2120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 2132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 2110 through an appropriate interface 2130 coupled to the system bus 2140. The output devices 2134 may include a monitor or other type of display device, which may also be connected to the system bus 2140 via an appropriate interface. In addition to (or instead of) the monitor, the personal computer may include other (peripheral) output devices (not shown), such as speakers and printers for example.

Alternatively, or in addition to microprocessors, FPGAs, other hardware, such as ASICS for example, may be used to implement one or more components of various embodiments consistent with the present invention.

Thus, various aspects of embodiments consistent with the present invention may be implemented in hardware and/or software.

§4.6 Conclusion

The exemplary processes described above permit sparse automations (such as AC automatons) to be implemented by very compact perfect hash tables, and allow these very compact perfect hash tables to be updated in an efficient manner. The $P^2$-Hashing process requires no memory access to generate the hash index and guarantees to return the hash result within the time of exact by one memory access. The processing of each character therefore requires only one memory access in a pipelined architecture. This property is very important for NIDS to survive under the attack of malicious traffic. The use of character translation table (Recall 1305.) won't change the above property, since the character translation table is not on the critical path of the AC automaton pipeline operation and works independent of the hash tables (Recall 1320 and 1390). $P^2$-Hashing supports both un-optimized and optimized AC automatons. Different from many existing perfect hashing schemes which require additional storage for their own representations, $P^2$-Hashing requires no storage overhead to implement the perfect hashing function (except for the small fixed 256-entry character translation table). This is achieved by embedding information directly into the AC automaton structure. $P^2$-Hashing requires no memory access to generate the hash index. (A character translation table needs to be accessed one time slot before the generation of the hash index, but it is not on the critical path of the AC automaton operation and therefore can be implemented by a separate pipeline stage.) This property is important to AC automaton operation because only one hash query can be performed on the fly due to dependency between two contiguous transitions made on the automaton. A fast hash index generation can speed up the automaton operation. A unified perfect hashing solution to implement all search tables in the AC automaton implementation (which include a transition table and a rule ID table) has been described. An important advantage of this unified perfect hashing solution is that it avoids pointers which are normally required to connect different tables, so that the memory cost is minimized.

What is claimed is:

1. A computer-implemented method for inserting a representation of a new rule, defined as a set of at least one new transition corresponding to the new rule, each of the at least one new transition of the set being from a source state to a destination state, into a perfect hash table which includes previously placed transitions, each of the previously placed transitions being from a source state to a destination state, to generate an updated perfect hash table, the computer-implemented method comprising, for each of the at least one new transition of the new rule:

a) hashing the new transition;
b) determining whether the hashed new transition collides with any of the previously placed transitions;
c) responsive to a determination that there is no collision, inserting the hashed new transition into the perfect hash table, and otherwise, responsive to a determination that the hashed new transition collides with any of the previously placed transitions,
  1) determining whether or not the source state associated with the new transition has more transitions than a state associated with the colliding transition, and 2) responsive to a determination that the source state associated with the new transition has equal or more transitions than the source state associated with the colliding transition,
   A) removing from the hash table any transitions of the source state associated with the colliding transition,
   B) placing the hashed new transition into the perfect hash table, and
   C) re-placing the removed transitions into the hash table such that
   the hash table is maintained as a perfect hash table,
   otherwise, responsive to a determination that the source state associated with the new transition has fewer transitions than the source state associated with the colliding transition,
   A) removing any previously placed transitions of the source state associated with the new transition, and
   B) re-placing the transitions of the source state associated with the new transition into the hash table such that the hash table is maintained as a perfect hash table.

2. The computer-implemented method of claim 1 wherein each new transition of the new rule is only provisionally placed before the act of determining whether or not the source state associated with the new transition has fewer transitions than the source state associated with the colliding transition.

3. The computer-implemented method of claim 1 wherein the act of re-placing the removed transitions of a state into the hash table includes
   1) renaming the source state to which the removed transitions belong,
   2) hashing each of the removed transitions of the renamed state,
   3) determining whether any of the hashed removed transitions of the renamed state collides with any transitions currently placed in the hash table,
   4) responsive to a determination that none of the hashed removed transitions of the renamed state collides with any transitions currently placed in the hash table,
      inserting the hashed removed transitions of the renamed state into the perfect hash table to generate the updated perfect hash table,
   otherwise, responsive to a determination that any of the hashed removed transitions of the renamed state collides with any transitions currently placed in the hash table,
      re-placing either (A) the hashed removed transitions of the renamed state, or (B) all transitions associated with any state to which any of the colliding transitions currently placed in the hash table belongs, based on whether or not a size of a state associated with any colliding transitions currently placed in the hash table is larger than a number determined using the size of the renamed state.

4. The computer-implemented method of claim 3 wherein the act of re-placing either (A) the hashed removed transitions of the renamed state, or (B) all transitions associated with any state to which any of the colliding transitions currently placed in the hash table belongs, based on whether or not a size of a state associated with any colliding transitions currently placed in the hash table is larger than a number determined using the size of the renamed state includes using a size of the renamed state to lookup the predetermined number from a table.

5. The computer-implemented method of claim 4 wherein the table includes a plurality of entries, and
   wherein the x-th entry of the table indicates the size of the maximal state that can be kicked out of the hash table by a state with size x, wherein x is a whole number.

6. The computer-implemented method of claim 5 wherein the maximal state that can be kicked out by a state with size x is one that causes a minimum of an expected number of state renames required to insert a state with size x.

7. The computer-implemented method of claim 5 wherein the maximal state that can be kicked out by a state with size x is one that causes a minimum of an expected number memory accesses required to insert a state with size x.

8. The computer-implemented method of claim 1 wherein the act of re-placing the removed transitions, of a state associated with the new transition corresponding to the new rule, into the hash table includes
   1) renaming the source state associated with the new transition corresponding to the new rule,
   2) hashing each of the transitions of the renamed state,
   3) determining whether any of the hashed transitions of the renamed state collides with any transitions currently placed in the hash table,
   4) responsive to a determination that none of the hashed transitions of the renamed state collides with any transitions currently placed in the hash table,
      inserting the hashed transitions of the renamed state into the perfect hash table to generate the updated perfect hash table,
   otherwise, responsive to a determination that any of the hashed transitions of the renamed state collides with any transitions currently placed in the hash table,
      re-placing either (A) the hashed transitions of the renamed state, or (B) all transitions associated with any state to which any of the colliding transitions currently placed in the hash table belong, based on whether or not a size of a state associated with any colliding transitions currently placed in the hash table is larger than a number determined using the size of the renamed state.

9. The computer-implemented method of claim 8 wherein the act of re-placing either (A) the hashed transitions of the renamed state, or (B) all transitions associated with any state to which any of the colliding transitions currently placed in the hash table belong, based on whether or not a size of a state associated with any colliding transitions currently placed in the hash table is larger than a number determined using the size of the renamed state includes using the size of the renamed state to lookup the predetermined number from a table.

10. The computer-implemented method of claim 9 wherein the table includes a plurality of entries, and
    wherein the x-th entry of the table indicates the size of the maximal state that can be kicked out of the hash table by a state with size x, wherein x is a whole number.

11. The computer-implemented method of claim 10 wherein the maximal state that can be kicked out by a state with size x is one that causes a minimum of an expected number of state renames required to insert a state with size x.

12. The computer-implemented method of claim 10 wherein the maximal state that can be kicked out by a state with size x is one that causes a minimum of an expected number memory accesses required to insert a state with size x.

13. Apparatus for inserting a representation of a new rule, defined as a set of at least one new transition corresponding to the new rule, each of the at least one new transition of the set being from a source state to a destination state, into a perfect hash table which includes previously placed transitions, each of the previously placed transitions being from a source state to a destination state, to generate an updated perfect hash table, the apparatus comprising:
- a) at least one processor; and
- b) a non-transitory storage device storing processor-executable instructions which, when executed by the at least one processor, cause the at least one processor to perform a method including, for each of the at least one new transition of the new rule:
    1) hashing the new transition;
    2) determining whether the hashed new transition collides with any of the previously placed transitions;
    3) responsive to a determination that there is no collision,
        inserting the hashed new transition into the perfect hash table, and otherwise, responsive to a determination that the hashed new transition collides with any of the previously placed transitions,
        A) determining whether or not the source state associated with the new transition has more transitions than a state associated with the colliding transition, and
        B) responsive to a determination that the source state associated with the new transition has equal or more transitions than the source state associated with the colliding transition,
            i) removing from the hash table any transitions of the source state associated with the colliding transition,
            ii) placing the hashed new transition into the perfect hash table, and
            iii) re-placing the removed transitions into the hash table such that the hash table is maintained as a perfect hash table,
        otherwise, responsive to a determination that the source state associated with the new transition has fewer transitions than the source state associated with the colliding transition,
            i) removing any previously placed transitions of the source state associated with the new transition, and
            ii) re-placing the transitions of the source state associated with the new transition into the hash table such that the hash table is maintained as a perfect hash table.

14. The apparatus of claim 13 wherein each new transition of the new rule is only provisionally placed before the act of determining whether or not the source state associated with the new transition has fewer transitions than the source state associated with the colliding transition.

15. The apparatus of claim 13 wherein the act of re-placing the removed transitions of a state into the hash table includes
- aa) renaming the source state to which the removed transitions belong,
- bb) hashing each of the removed transitions of the renamed state,
- cc) determining whether any of the hashed removed transitions of the renamed state collides with any transitions currently placed in the hash table,
- dd) responsive to a determination that none of the hashed removed transitions of the renamed state collides with any transitions currently placed in the hash table,
    inserting the hashed removed transitions of the renamed state into the perfect hash table to generate the updated perfect hash table, otherwise, responsive to a determination that any of the hashed removed transitions of the renamed state collides with any transitions currently placed in the hash table,
    re-placing either (A) the hashed removed transitions of the renamed state, or (B) all transitions associated with any state to which any of the colliding transitions currently placed in the hash table belongs, based on whether or not a size of a state associated with any colliding transitions currently placed in the hash table is larger than a number determined using the size of the renamed state.

16. The apparatus of claim 15 wherein the act of re-placing either (A) the hashed removed transitions of the renamed state, or (B) all transitions associated with any state to which any of the colliding transitions currently placed in the hash table belongs, based on whether or not a size of a state associated with any colliding transitions currently placed in the hash table is larger than a number determined using the size of the renamed state includes using a size of the renamed state to lookup the predetermined number from a table.

17. The apparatus of claim 13 wherein the act of re-placing the removed transitions, of a state associated with the new transition corresponding to the new rule, into the hash table includes
- aa) renaming the source state associated with the new transition corresponding to the new rule,
- bb) hashing each of the transitions of the renamed state,
- cc) determining whether any of the hashed transitions of the renamed state collides with any transitions currently placed in the hash table,
- dd) responsive to a determination that none of the hashed transitions of the renamed state collides with any transitions currently placed in the hash table,
    inserting the hashed transitions of the renamed state into the perfect hash table to generate the updated perfect hash table, otherwise, responsive to a determination that any of the hashed transitions of the renamed state collides with any transitions currently placed in the hash table,
    re-placing either (A) the hashed transitions of the renamed state, or (B) all transitions associated with any state to which any of the colliding transitions currently placed in the hash table belong, based on whether or not a size of a state associated with any colliding transitions currently placed in the hash table is larger than a number determined using the size of the renamed state.

18. The apparatus of claim 17 wherein the act of re-placing either (A) the hashed transitions of the renamed state, or (B) all transitions associated with any state to which any of the colliding transitions currently placed in the hash table belong, based on whether or not a size of a state associated with any colliding transitions currently placed in the hash table is larger than a number determined using the size of the renamed state includes using the size of the renamed state to lookup the predetermined number from a table.

19. The apparatus of claim 18 wherein the table includes a plurality of entries, and
wherein the x-th entry of the table indicates the size of the maximal state that can be kicked out of the hash table by a state with size x, wherein x is a whole number.

* * * * *